US009860276B2

United States Patent
Crane et al.

(10) Patent No.: US 9,860,276 B2
(45) Date of Patent: Jan. 2, 2018

(54) EMERGENT NETWORK DEFENSE

(71) Applicant: The George Washington University, Washington, DC (US)

(72) Inventors: Earl N. Crane, Washington, DC (US); Sara M. Crane, Washington, DC (US); Julie C. Ryan, Washington, DC (US)

(73) Assignee: The George Washington University, Washington, DC (US)

( * ) Notice: Subject to any disclaimer, the term of this patent is extended or adjusted under 35 U.S.C. 154(b) by 0 days.

(21) Appl. No.: 14/428,590

(22) PCT Filed: Sep. 18, 2013

(86) PCT No.: PCT/US2013/060425
§ 371 (c)(1),
(2) Date: Mar. 16, 2015

(87) PCT Pub. No.: WO2014/182326
PCT Pub. Date: Nov. 13, 2014

(65) Prior Publication Data
US 2015/0249685 A1 Sep. 3, 2015

Related U.S. Application Data

(60) Provisional application No. 61/702,484, filed on Sep. 18, 2012.

(51) Int. Cl.
*H04L 29/06* (2006.01)
*H04L 29/08* (2006.01)
(52) U.S. Cl.
CPC ............ *H04L 63/20* (2013.01); *H04L 63/145* (2013.01); *H04L 63/1425* (2013.01); *H04L 63/1433* (2013.01); *H04L 63/1441* (2013.01); *H04L 67/10* (2013.01)

(58) Field of Classification Search
None
See application file for complete search history.

(56) References Cited

U.S. PATENT DOCUMENTS

| 6,397,061 B1 | 5/2002 | Jordan |
| 2003/0142851 A1 | 7/2003 | Brueckner et al. |
| 2005/0132166 A1* | 6/2005 | Saffre ............... G06F 21/577 712/26 |

(Continued)

FOREIGN PATENT DOCUMENTS

| EP | 1355468 A1 | 10/2003 |
| WO | WO-2009122437 A2 | 10/2009 |

OTHER PUBLICATIONS

Hernandez et al., Classification of Graph Metrics, Nov. 2011, htpps://www.nas.ewi.tudelft.nl/people/Piet/papers/TUDreport20111111_MetricList.pdf.*

(Continued)

*Primary Examiner* — Brandon Hoffman
(74) *Attorney, Agent, or Firm* — Blank Rome LLP

(57) ABSTRACT

A system and method are provided of a node for use in a network having a plurality of nodes. The node is configured to identify neighboring node(s) within a predetermined closeness of said node, measured by any of physical, logical, network hops, network link, or vertices analysis closeness. The node determines a level of nervousness of itself and sends and/or receives communication as to the level of nervousness to the neighboring node(s).

30 Claims, 7 Drawing Sheets

NETWORK NERVOUSNESS ASSESSMENT

(56) References Cited

U.S. PATENT DOCUMENTS

| | | |
|---|---|---|
| 2005/1014972 | 7/2005 | Saffre |
| 2008/0226073 A1 | 9/2008 | Hawkes |
| 2009/0005975 A1 | 1/2009 | Forstall |
| 2010/0306852 A1 | 12/2010 | Adar |
| 2012/0309417 A1 | 12/2012 | Blom |
| 2013/0086676 A1 | 4/2013 | Chess |
| 2013/0191919 A1 | 7/2013 | Basavapatna |

OTHER PUBLICATIONS

PCT International Preliminary Report on Patentability and Written Opinion for PCT/US2013/060425 dated Aug. 18, 2015; 7 pgs.

T.A. Wadlow; "The process of network security: Designing and managing a safe network"; Reading Mass: Addison Wesley; 2000; pp. 1, 33, 45, 51, 159, 162, 193-206 and 208-211.

C.F. Kruegel; "Open Issues, Intrusion Detection and Correlation Challenges and Solutions"; Advance in Information Security Book Series; Springer US; 2005; vol. 4; pp. 103-107.

S.A. Kauffman; "The origins of order: Self organization and selection in evolution"; New York: Oxford University Press; 1993; pp. 3, 16, 18, 25, 29-30, 33, 36, 40, 69-70, 95, 121-122, 142, 156, 173-175, 177-178, 181, 185, 192-193, 195-196, 198-199, 201, 209-211, 219, 223, 237-238, 242, 245, 255, 278, 285 and 287.

N.R. Franks; "The Behavioural Ecology of Ants"; Glasgow, New York: Blackie; Chapman and Hall; 1987; pp. 46-47, 64, 79-80, 87, 90-91, 94-109, 111-112, 114-115 and 158-160.

Greensmith; "Dendritic Cells for Anomaly Detection"; Paper presented at the Evolutionary Computation; CEC 2006; IEEE Congress; pp. 664-671.

Aickelin et al.; "Sensing Danger: Innate Immunology for Intrusion Detection"; School of Computer Science; University of Nottingham; 2008; pp. 1-23.

J. Boardman et al.; "Systems Thinking: Coping with 21$^{st}$ Century Problems"; Boca Raton, FL: CRC Press; 2008; pp. 10, 34, 36, 39, 48, 50-55, 59, 62-63, 80-81, 99-101, 122, 127-129, 131, 147, 155-156, 159-162, 166, 188-189 and 204.

Stephanie Forrest et al.; "Self-Nonself Discrimination in a Computer"; Santa Fe Institute; Proceedings of 1994 IEEE Symposium on Research in Security and Privacy; 1994; 12 pages.

Steven Hofmeyr; "An Immunological Model of Distributed Detection and Its Application to Computer Security"; Doctor of Philosophy Computer Science; May 1999; 135 pages.

Melanie Mitchell; "Self-Awareness and Control in Decentralized Systems"; Computer Science Department; 2005; 6 pages.

Rick Dove et al.; "On Discovery and Display of Agile Security Patterns"; 8$^{th}$ Conference on Systems Engineering Research; Mar. 17-19, 2010; 10 pages.

Jericho Forum-White Paper; "Business rationale for de-perimeterisation"; www.Jerichoforum.org; Version 1.0; Jan. 2007; 4 pages.

Uwe Aickelin et al.; "Sensing Danger: Innate Immunology for Instrusion Detection"; Information Security Technical Report; vol. 12; Issue 4; 2007; 23 pages.

Chris G. Langton; "Computation at the Edge of Chaos: Phase Transitions and Emergent Computation"; Physica D 42; Elsevier Science Publisher B.V.; 1990; pp. 12-37.

Russell Eberhart; "A New Optimizer Using Particle Swarm Theory" Sixth International Symposium on Micro Machine and Human Science; 1995; pp. 39-43.

Jon Timmis et al.; "On artificial immune systems and swarm intelligence"; Swarm Intell, 2010; pp. 247-273.

Seymour E. Goodman et al.; "Toward a Safer and More Secure Cyberspace"; The National Academies Press; www.nap.edu/catalog/11925.html; 329 pages.

Langton; Evernote Export; Computation at the Edge of Chaos: Phase transitions and emergent computation; 1990.

James Kennedy et al.; "Particle Swarm Optimization"; Purdue School of Engineering and Technology; 1995; pp. 1942-1948.

Kauffman; "Conceptual outline of current evolutionary theory"; Evernote Export; 1993; 5 pages.

Rick Dove; "Pattern Qualifications and Examples of Next-Generation Agile System-Security Strategies"; Copyright Material; IEEE International Carnahan Conference of Security Technology; 2010; 10 pages.

Michael Howard et al.; "Measuring Relative Attack Surfaces"; 2004; 14 pages.

European Search Report issued for EP 13884031.9, dated Sep. 8, 2016, 7 pages.

\* cited by examiner

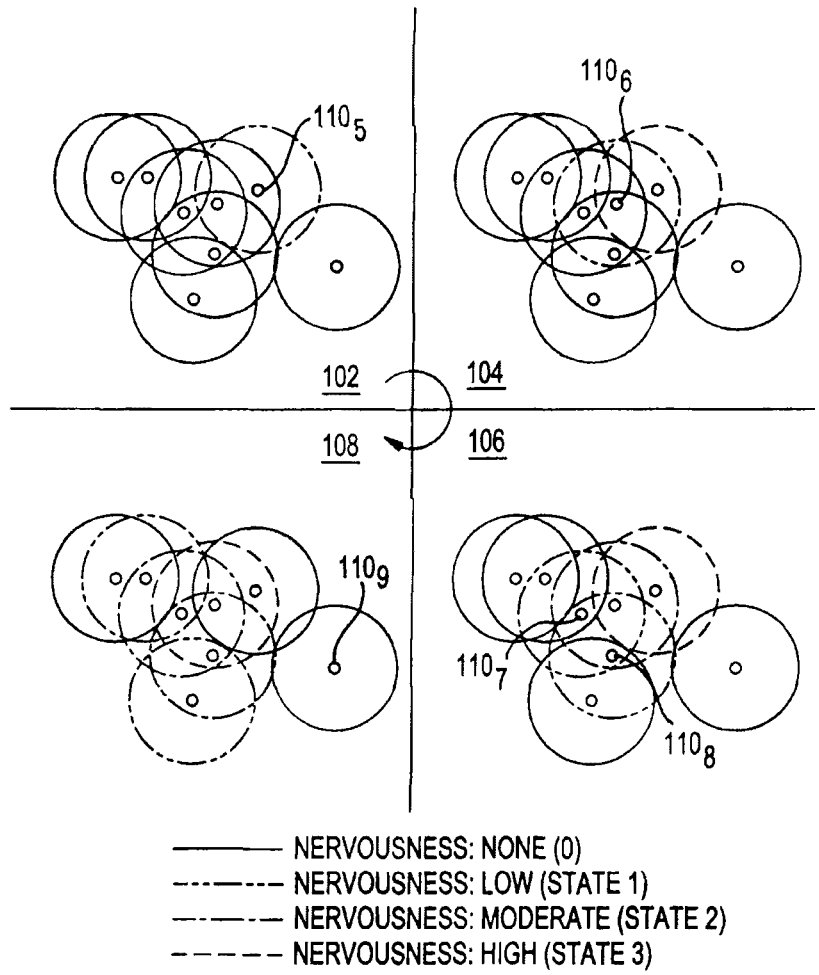
— NERVOUSNESS: NONE (0)
---·--- NERVOUSNESS: LOW (STATE 1)
---·-- NERVOUSNESS: MODERATE (STATE 2)
- - - - NERVOUSNESS: HIGH (STATE 3)
FIG. 1 NETWORK NERVOUSNESS ASSESSMENT
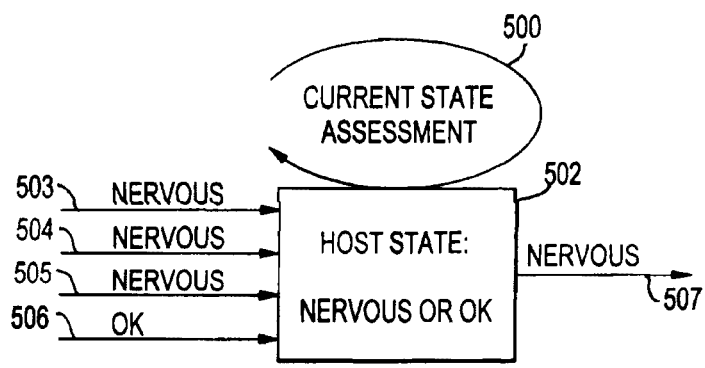
FIG. 5 THEORETICAL CONTEXT DIAGRAM FOR BLOCK ONE

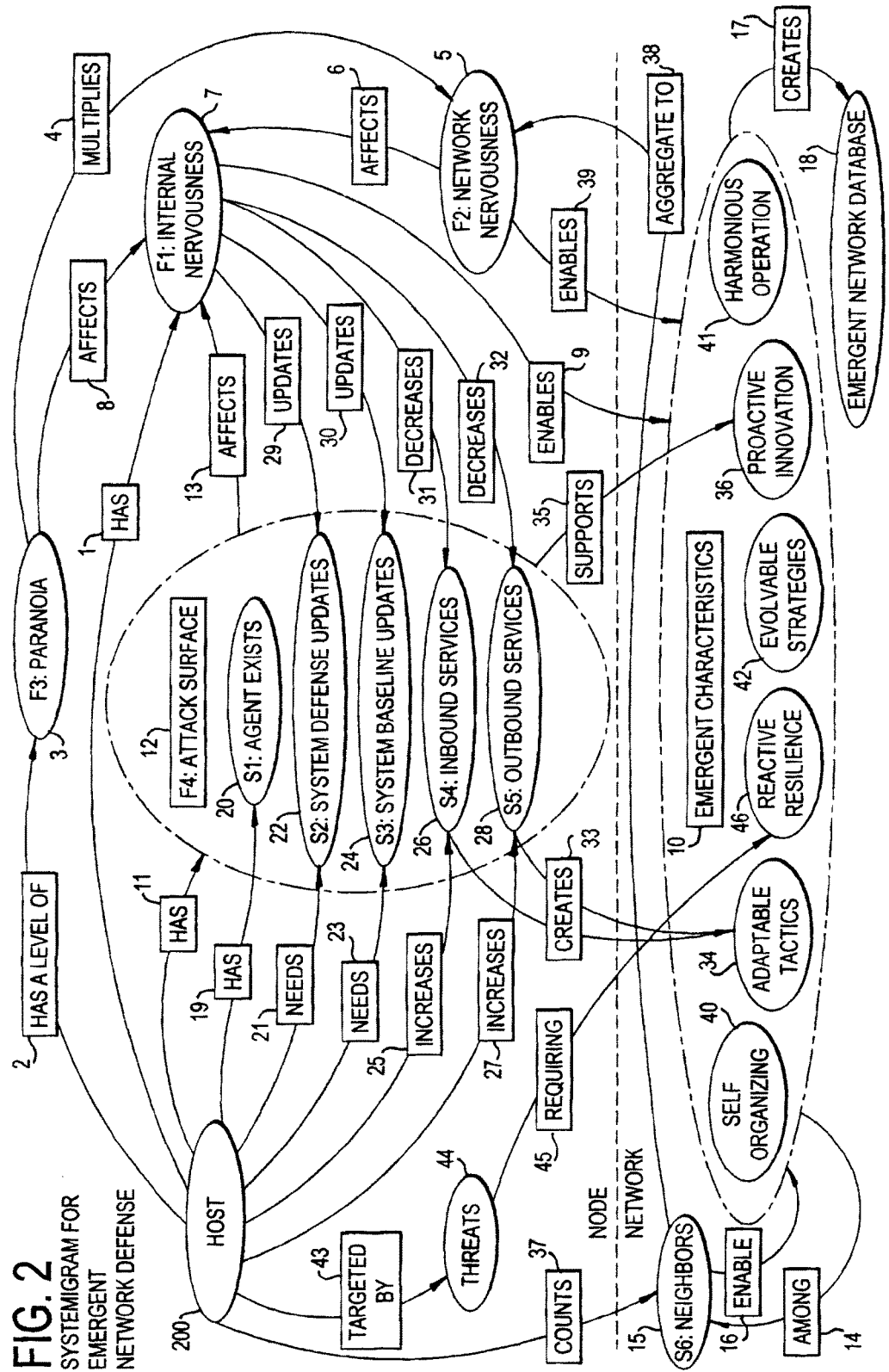
FIG. 2 SYSTEMIGRAM FOR EMERGENT NETWORK DEFENSE

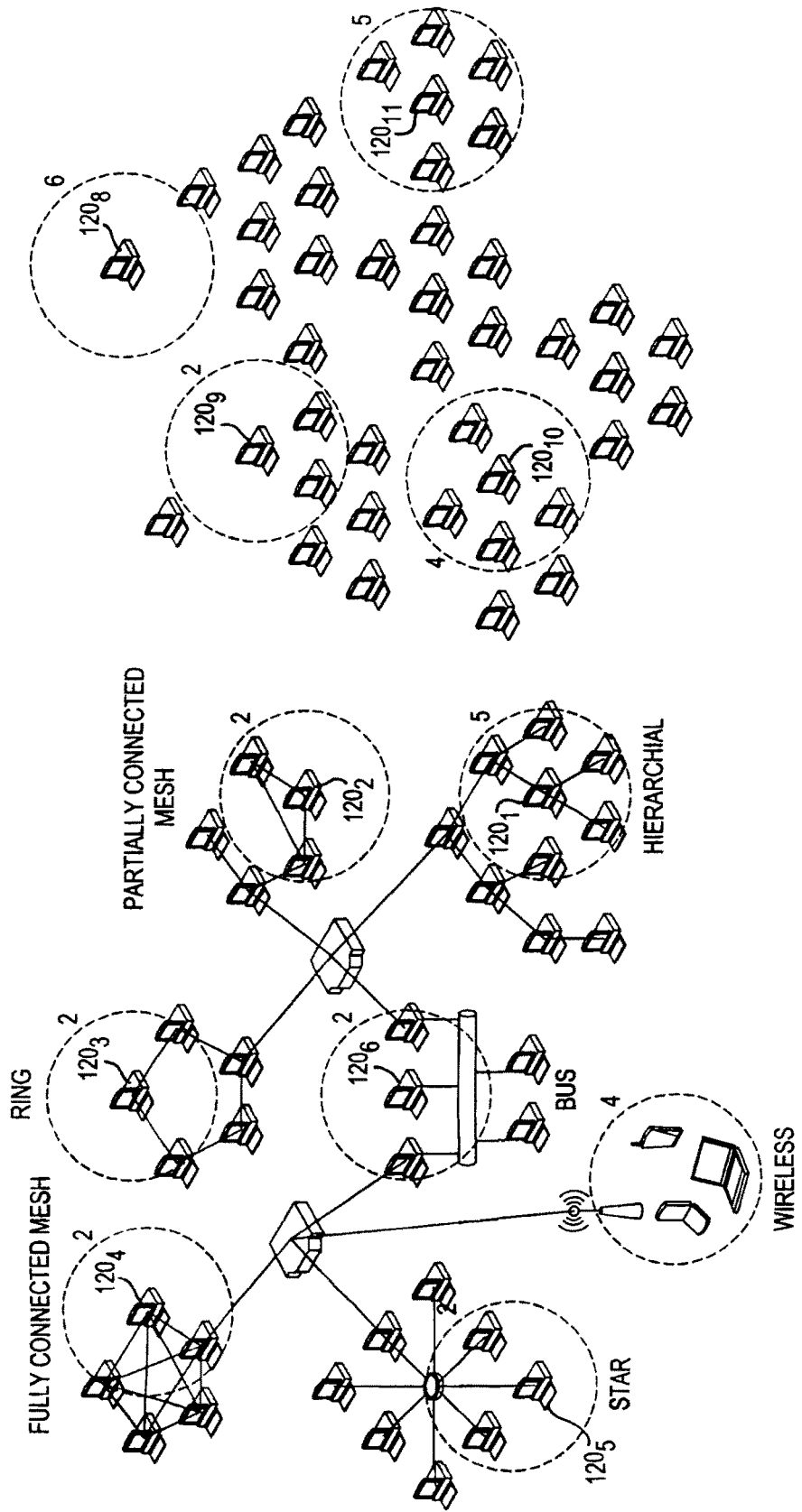
FIG. 3 NEAREST NEIGHBOR ABSTRACTION

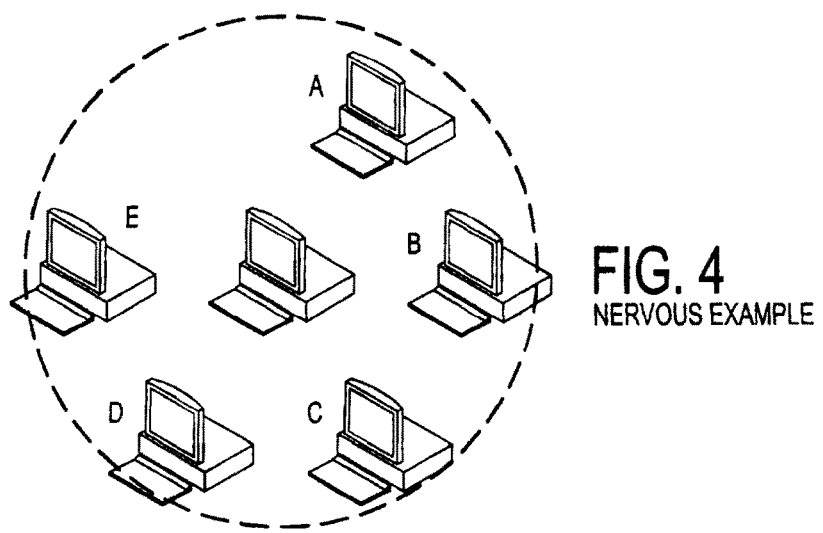
FIG. 4 NERVOUS EXAMPLE
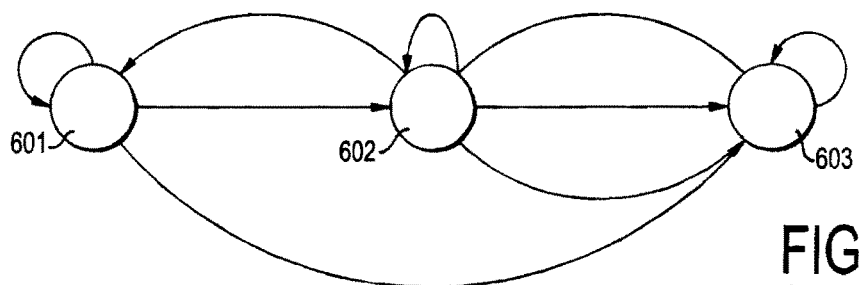
FIG. 6 STATE CHANGE
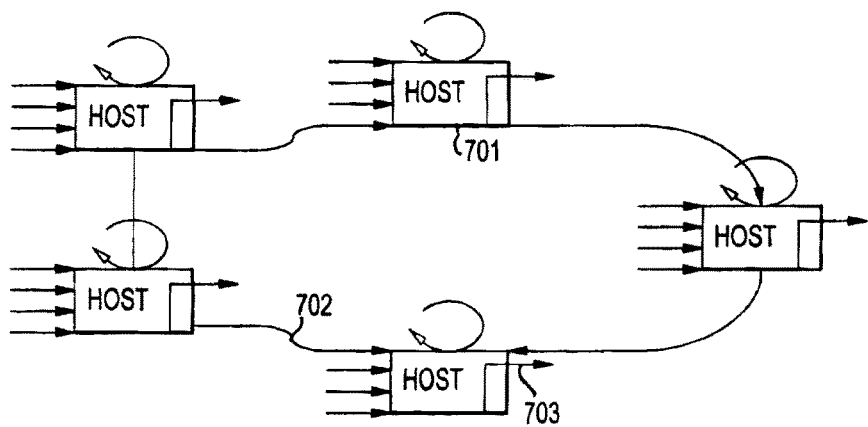
FIG. 7 THEORETICAL CONTEXT DIAGRAM FOR BLOCK TWO

THREE ALERTS DEMONSTRATE EMERGENT BEHAVIOR

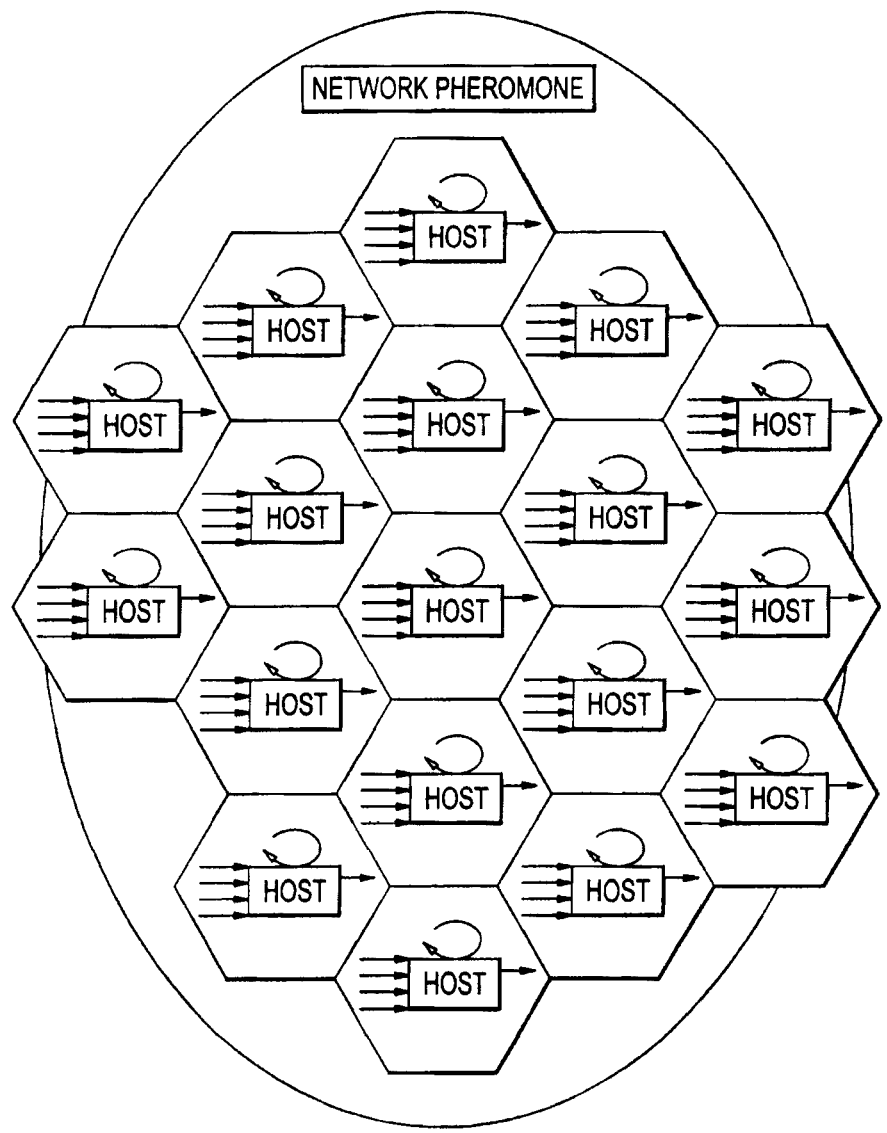
FIG. 9 THEORETICAL CONTEXT DIAGRAM FOR BLOCK THREE

| FEEDBACK DATA: | STATE DATA: |
|---|---|
| F1: LEVEL OF INTERNAL NERVOUSNESS | S1: AGENT EXISTS ON NODE |
| F2: LEVEL OF NETWORK NERVOUSNESS | S2: SYSTEM DEFENSES (HBSS, AV, IDS) AT LATEST SIGNATURE LEVEL |
| F3: LEVEL OF PARANOIA | S3: SYSTEM BASELINE (OS, APPLICATIONS) AT LATEST PATCH/CONFIGURATION LEVEL |
| F4: ATTACK SURFACE | S4: INBOUND SERVICES RESTRICTED (SERVICES RESTRICTED, PORTS BLOCKED) |
|  | S5: OUTBOUND SERVICES RESTRICTED (BLOCKED IP, SUBNETS, URLs) |
|  | S6: NUMBER OF NEIGHBORS |

| | F1: LEVEL OF INTERNAL NERVOUSNESS | F2: LEVEL OF NETWORK NERVOUSNESS | F3: LEVEL OF PARANOIA | F4: ATTACK SURFACE | S1: AGENT EXISTS ON NODE | S2: SYSTEM DEFENSES AT LATEST SIGNATURE LEVEL | S3: SYSTEM BASELINE AT LATEST PATCH/CONFIGURATION LEVEL | S4: INBOUND SERVICES RESTRICTED | S5: OUTBOUND SERVICES RESTRICTED | S6: NUMBER OF NEIGHBORS |
|---|---|---|---|---|---|---|---|---|---|---|
| BLOCK ONE: ENDPOINT ATTACK SURFACE CHARACTERISTICS | | | | X | X | X | X | X | X | |
| BLOCK TWO: ENDPOINT NODES SHARE SECURITY STATES THROUGH "NERVOUS NETWORK" | X | X | X | X | | | | | | X |
| BLOCK THREE: NODE SYSTEMS CHANGE THEIR ATTACK SURFACE AND NODE NERVOUS STATE BASED ON INPUTS | X | X | X | X | X | X | X | X | X | X |

FIG. 10 REQUIRED DATA ELEMENTS

EMERGENT NETWORK DEFENSE

RELATED APPLICATION

This application is a national phase of PCT/US2013/60425, filed Sep. 18, 2013, which claims the benefit of U.S. Provisional Application No. 61/702,484, filed Sep. 18, 2012. The entire contents of those applications are incorporated herein by reference.

BACKGROUND OF THE INVENTION

Field of the Invention

The present invention relates to network security.

Background of the Related Art

Information security applied to computer and network security traditionally focuses on a single host in isolation, defining a security baseline and controls for a single host, and centrally managing the host policy and configuration. However, this model does not scale well due to the rapid and continued growth of networked devices, including mobile phones, smart grids, personal computing devices, and network enabled devices.

Information security management is an important aspect to the continued use of information systems to store, process, and transmit information. As systems, technology, users, and attackers increase in sophistication, defensive strategies and response tactics must evolve to match their sophistication. The current model of Computer Network Defense (CND) is becoming increasingly difficult to manage, while the defenders protecting increasing numbers of information systems are outnumbered as both human and automated attackers increase by the thousands. The current model of CND does not efficiently scale. The use of agents to monitor endpoint host characteristics is not new, nor is their use in interesting emergent behavior. (S. A. Hofmeyr, *An immunological model of distributed detection and its application to computer security,* 1999.) However, few works to date have attempted to evaluate the simple security-focused hygiene characteristics necessary to generate emergent security-oriented behavior in a complex environment. (See M. Mitchell, *Self-awareness and control in decentralized systems.* Presented at Metacognition in Computation, 2005 and R. Dove and L. Shirey, *On discovery and display of agile security patterns,* Presented at 8th Conference on Systems Engineering Research, 2010.)

The contemporary security structure instantiated in networked computer systems is sophisticated and complicated. Various paradigms support the conceptualization and development of security approaches, including those of a walled fortress, layered defense-in-depth, and immune system modeling. The initial imperative was to stop intruders from gaining unauthorized access to enterprise information assets. As new capabilities emerged, such as virtual private networks, and as new operational parameters evolved, such as teleworking, the concept of a singular system that could be protected has gradually eroded. This erosion has accelerated with the adoption of cloud computing.

The inventors recognized that a focus on perimeter security, while useful, is inadequate and can result in a system with a "hard-candy shell with a soft, chewy center." (Wadlow, *The process of network security: Designing and managing a safe network,* 2000.) Not only is this model inadequate as it fails to provide defense once a single attacker has penetrated the network, it does not consider internal security to maintain defenses as attackers continue to persist within the network boundary. Additionally, the increasing number of virtual holes punched through the perimeter to allow authorized access from outside to inside for remote users, mobile users, and new services creates an increasingly porous boundary. The resultant de-perimeterization of the enterprise boundary has reduced the effectiveness of traditional security models (Jericho Forum 2007). It is widely recognized that the security field needs to become increasingly clever to develop new approaches that accommodate these realities (National Research Council 2007).

Attempts to make individual nodes on the network intelligent enough to recognize and handle threats have resulted in the development of technologies. One example is the work from the University of New Mexico in creating an immune system for computer systems, which would enable a computer to recognize alien software elements (Forrest et al., 1994). This immune system inspired research continues under many different exploratory paths (Timmis et al., 2010; Greensmith et al., 2006).

The operational challenge with running security software on computer systems is that recording and analyzing security-relevant events takes up processing cycles, thus reducing the available capacity for other uses, such as running the enterprise. When computers were much less powerful than they are today, this was a significant problem. It was not uncommon for networks to slow down to the point of being unusable if all options for security monitoring and analysis were selected (Kruegel et al., 2005). While the advances in computer speed and capacity have somewhat ameliorated this issue, it remains a significant challenge in very large systems where the amount of data to be collected, correlated, and analyzed is enormous.

SUMMARY OF THE INVENTION

Accordingly, there is a need for a scalable system and method for managing the security of systems in very large, heterogeneous, networked environments. Human intervention is slow when compared to the speed of the machines, and there are typically few humans associated with managing each network node. Malware infections spread with enormous speed through networks. Increasing numbers of unmanaged or poorly managed network nodes do not maintain the basic hygiene of configuration and patching. Various existing solutions assist in limiting the spread of malware and in the management of systems security, but many of them require trade-offs between processing overhead and network size. Accordingly, there is a need to engage the elements of the network so that each node assisted in the management of the security of the overall system such that large-scale networks can be managed without becoming burdensome to the network operations.

Enabling each node in the network to assist in this security management challenge is not a total solution to the problem but makes the challenge more tractable. Specifically, this invention is focused on enabling each node to contribute to the security management challenge by creating a capability at each node that continually assesses the operational environment and makes decisions based on that assessment regarding its operations. The decision process is based on two elements: input from near-neighbor nodes and self-assessment based on a priori conditional states. The end product of this decision space is a nervousness index which is used by each node to increase or decrease operational patterns of behavior. For the purpose of explaining this innovation, operational behavior patterns refer to processes that assist in the security management of a network by automatically reducing operational capabilities (attack surface) based on group environmental assessments. This provides the human administrator valuable input in the overall security state of the network as well as additional time to react when threats are detected in the networked environment. An automated reduction in attack surface is frequently accomplished by implementing basic information security hygiene, such as turning off services or ensuring patches and configurations are at their latest published level.

Additionally, to make the problem more tractable, the focus on reducing the nervousness index is conducted by applying a minimal number of security controls to a specified node. The basic operational capabilities used to reduce the attack surface are also known as "security hygiene", these are the most minimal security controls that must be implemented on a system to maintain a minimally acceptable security baseline. Specifically for this implementation, we consider minimal controls for "security hygiene" to include the management, maintenance, and operational control of node ports, protocols, operating system patch level, application patch level, anti-virus and Intrusion Detection System software signature and policy age, the amount of time since a system was last checked for policy compliance, and the delta between the current system state and the system configuration baseline. This is a limited set of the possible controls available to manage a node attack surface. Limiting the security controls to only a subset of those that affect the attack surface reduces the complexity of the overall system and illustrates the validity of this concept.

Additional controls beyond this minimal level add increased fidelity to the implementation and accuracy for nervous calculation, but do not alter the support for the occurrence of the fundamental concept of nervousness and attack surface management. However, the application of this invention is not limited only to attack surface reduction, both using minimal or robust hygiene security controls, as other factors may affect and reduce nervousness. These may include but are not limited to intelligence or forewarning of a future attack, suspected unauthorized user behavior, and external threat mitigation activities that reduce the likelihood of a successful attack by a threat. Part of the risk assessment of determining the current attacks surface is to recognize that some operational capabilities are more important than others. Some capabilities may provide additional services requiring increased availability, confidentiality, or integrity, which do not change the attack surface, but are determined through a risk assessment. Other operational capabilities may require fewer security considerations, enabling limited resources to focus on the most important elements of securing each node. This is one of the fundamental dynamics to this innovation, a new mechanism to measure and dynamically manipulate and mitigate information security risk.

A system and method are provided of a node for use in a network having a plurality of nodes. The node is configured to identify neighboring node(s) within a predetermined closeness of said node, measured by any of physical, logical, network hops, network link, or vertices analysis closeness. The node determines a level of nervousness of itself and sends and/or receives communication as to the level of nervousness to the neighboring node(s).

These and other objects of the invention, as well as many of the intended advantages thereof, will become more readily apparent when reference is made to the following description, taken in conjunction with the accompanying drawings.

BRIEF DESCRIPTION OF THE FIGURES

FIG. 1 is a diagram showing network nervousness assessment;

FIG. 2 is a systemigram for emergent network defense;
FIG. 3 illustrates nearest neighbor abstraction;
FIG. 4 provides a nervous example;
FIG. 5 is a theoretical context diagram for Block One;
FIG. 6 illustrates state change;
FIG. 7 is a theoretical context diagram for Block Two;
FIG. 9 is a theoretical context diagram for Block Three;
and
FIG. 10 illustrates Required Data Elements.

DETAILED DESCRIPTION OF THE INVENTION

Figure 8:
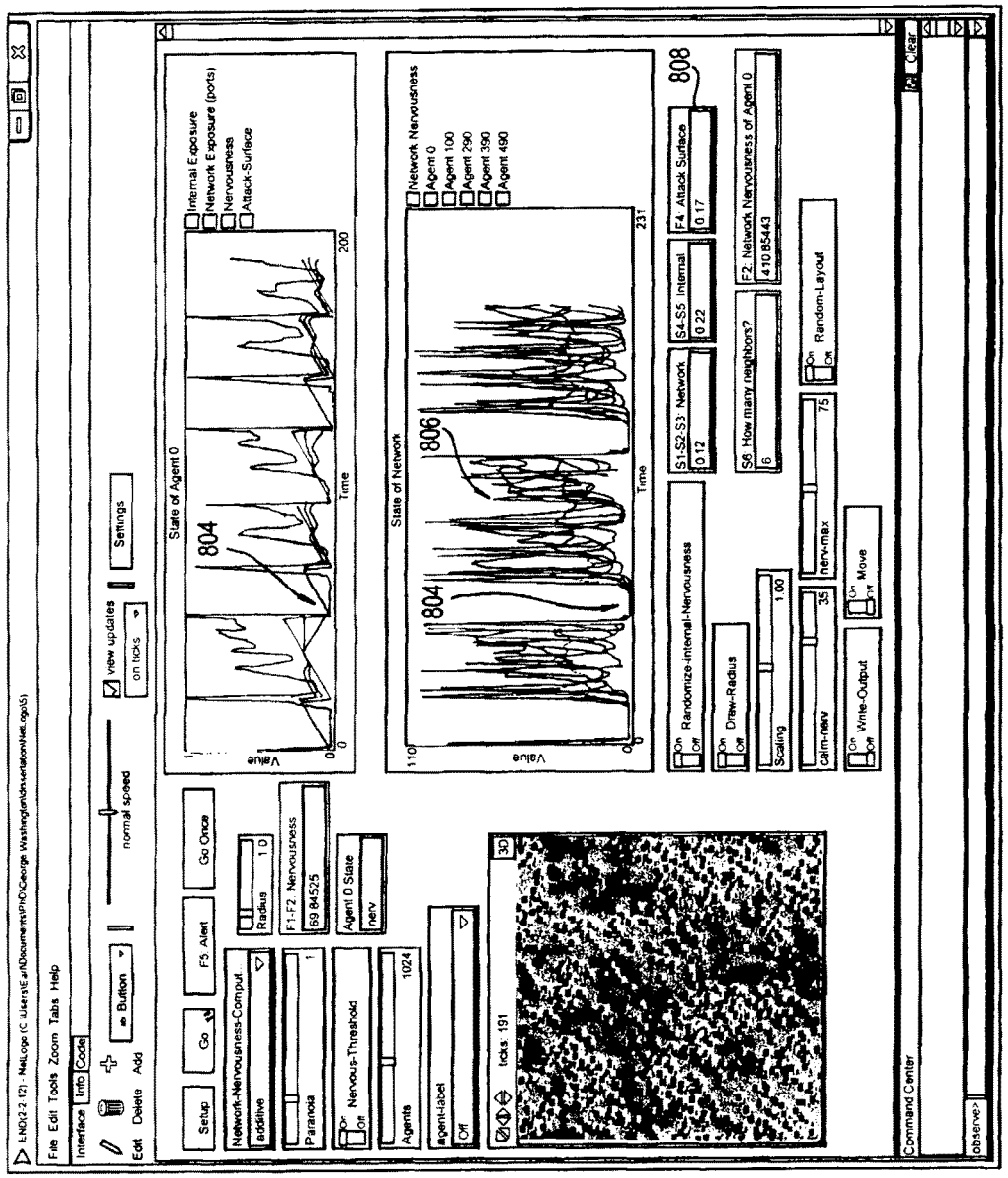
FIG. 8 is a screen shot showing three alerts to demonstrate emergent behavior.

In describing the preferred embodiments of the present invention illustrated in the drawings, specific terminology is resorted to for the sake of clarity. However, the present invention is not intended to be limited to the specific terms so selected, and it is to be understood that each specific term includes all technical equivalents that operate in a similar manner to accomplish a similar purpose.

For purposes of illustration and clarity but without intending to limit the invention, the term "node" is generally understood here to be an individual element with specific characteristics within an environment where the node can communicate with other neighboring nodes. A node is embodied as a "host", though this embodiment is not intended to limit the application of a node beyond a "host" as defined. The term "host" refers to a specific embodiment of a node as a processing device configured to communicate with neighboring node(s) and to determine a level of nervousness of said node and to send and/or receive communication as to the level of nervousness to the neighboring node(s). The term "local" refers to a predetermined closeness of said node to neighbor(s), measured by any of physical, logical, network hops, network link, or vertices analysis closeness. The term "agent" refers to a specific capability, such as software, that exists on a host operating as a node.

One purpose of present invention is to enable the use of local environmental primitive awareness in network nodes to make large scale network security management more effective and efficient. Effective security management is a risk management process and means that potential attacks have a lower probability of achieving their goals, and uses a surrogate variable of an attack surface for this calculation. Efficient security management means that responses to threats can be made more quickly through automated decisions based on local environmental assessments, using surrogate variables of the speed with which action is taken, and the speed in which a human operator is notified of a challenge.

The present invention provides an approach to security management in large heterogeneous networks that enhances a human administrator's ability to respond to detected threats. Traditional security management focuses on single hosts with centralized control, and does not scale well. This invention addresses the challenge of creating an internetworked environment to operate in a holistic manner to enable defense and resiliency of the networked environment. Several non-limiting embodiments of the invention are discussed below to establish a "security ecosystem" for security management in a large heterogeneous network, acknowledging the increasing sophistication in threats, complexity of defense, and growth of the attack surface to be defended. A security ecosystem recognizes that machines deal with threats from other machines in machine-time, and humans deal with threats from other humans in human-time. Automation is the first building block of a healthy cyber ecosystem. (Department of Homeland Security, 2011) This invention provides decentralized models considering which characteristics are essential to enable the participation of networked devices and enhance a human administrator's ability to respond to detected threats.

The present invention considers pheromones and swarm theory. Pheromones are chemicals released by organisms in order to communicate very limited and specific messages to others in the group. Swarm behavior is the movement of groups of organisms in concert in response to stimulus. (New Oxford American Dictionary, 2011) Swarm theory uses swarm behavior to observe groups for the emergence of interesting properties. Pheromones are extremely limited in nature and yet convey important information to members of the group, which then modifies individual and group behavior accordingly. The analogy to computing systems is that the pheromone analog would require very few resources, which is a performance constraint for the present invention. Swarm theory is a group activity observed through the combined interactions of eusocial insects, such ants or bees. The group activity has impacts beyond the individual node activity, where the intelligence of the system is greater than the sum intelligence of the individual parts. (C. G. Langton, *Computation at the edge of chaos: Phase transitions and emergent computation*, Physica D 42(1-3), pp. 12-37, 1990; S. A. Kauffman, *The Origins of Order: Self Organization and Selection in Evolution*, New York: Oxford University Press, 1993; J. Kennedy and R, Eberhart. *Particle swarm optimization*, Presented at Neural Networks, 1995, Proceedings, IEEE International Conference, 1995).

A pheromone analog is used to communicate a level of nervousness between nodes on a network. The expression of this pheromone analog is the Nervous Signal (NS), generated by the Nervousness Assessor (NA). The NA at any node also receives and integrates NSs from communicating neighbors. When a NA receives one or more NSs from the network, the NA integrates the information contained into an assessment of the current state of the node. The assessment includes the essential node characteristics in terms of operational status. Finally, the Nervousness Operator (NO) acts upon the node to change operational status, such as increasing or reducing attack surface.

The Nervous Signal (NS) communicates a state of nervousness to a node's nearest neighbors. An analogy of this concept is the observation of a crowd of people. When one person exhibits certain behaviors, such as looking in a particular direction, nearest neighbors who observe the activity will also look in the same direction, with the possibility that there may in fact be something worthy of their attention. Note that humans are not eusocial animals, thus analogy of emergent characteristics through human behavior is not robust.

The Nervousness Assessor (NA) computes the state of nervousness of a node and both transmits and receives Nervousness Signals. Node nervousness computation uses nearest neighbor nervousness and internal state configurations. For the purposes of this invention, the internal state characteristics chosen were the following: current attack surface, previous level of nervousness, and level of paranoia. The concept of paranoia in this case is a tunable characteristic set by the human operator, so that reactions of the NA can be set according to the operational environment requirements.

The reaction to the assessment of nervousness contributes the behavioral component to this theory. The node receives Nervous Signals (NS) from the environment, and the Nervousness Assessor (NA) makes an assessment regarding what the state of nervousness should be at the individual node. Then the NS communicates the updated nervous state, and the NO acts in accordance with the predefined behavior parameters. Actions may include increasing or decreasing the internal or network attack surface, by reducing the number of active ports, checking for unapplied patches, updating the configuration to the latest policy, alerting the human administrator, or even shutting down completely.

This individual node behavior contributes to a larger behavior pattern in the system. The embodiment of the invention demonstrates that as individual nodes became more nervous, their neighbors reflect an increase in nervousness. This behavior was observable in terms of point of origin of source of nervousness and in terms of spreading reactions. A model is provided to examine how the behaviors might emerge.

Model

The formal model relies on a two-tuple state machine of node nervousness $A=<S,F>$ where S is a set of states, and $F \subseteq S$ is a set of feedback states (where S and F are further utilized in FIG. 2). A node state $s \in S$ is a mapping of node resources to their configurations:

$$s: \text{res}_a \rightarrow \text{conf}_a$$

Resources include things such as ports, services, and administration functions such as patching, signature updates, and policy management. Configurations are the settings applied to resources, such as ports to block and patch frequency. Broadly the node state s is representative of the attack surface, and includes both internal attack surface and network attack surface, combined to one measurement for this model.

To calculate nervousness at any node, the Nervousness Assessment (NA) at any node is a product of the feedback of the Nervous Signal (NS) in the local area and the system configuration state.

Network Nervousness ($\text{Nerv}_n$) iterates at each time step of analysis of nervousness:

$$\text{Nerv}_n : \text{Nerv}_n \rightarrow \text{Nerv}_{n+1}$$

Nervousness is the localized environmental neighbor nervousness, calculated as the nervousness of each local node m summed to calculate the localized Network Nervousness for a specific node location.

$$\text{Nerv}_n = \Sigma_0^m \text{Nerv}_a$$

Then the system feedback F is Network Nervousness multiplied by the node scaling factor Paranoia.

$$F: \text{Nerv}_n \cdot \text{Par}_a$$

The actions taken at each state are tunable to the needs of the environment. At state 1, where all activity is normal and the state of nervousness is "calm", the system would be set at the most open, as defined by the operational parameters. At each subsequent state, which could be more than three in total, actions as defined by the operational policy successively reduce the attack surface by implementing more restricting configurations.

We then model the state machine A nervousness as a combination of configuration of the node and the feedback of the system:

$$A : s \cdot F$$

where $$A = \text{conf}_a \cdot \text{Nerv}_n \cdot \text{Par}_a$$

With the definition of the node state modeled s, we can examine for specific characteristics. Given a daily update cycle to maintain configuration of resources, consider the variables for each node: average daily operational time o; average daily downtime for configuration c; and relative size of attack surface at any point in time We can specify that during a 24 hour window d, to minimize the time of configuration c:

$$\text{Conf}_c : \text{Conf}_M \rightarrow \text{Conf}_{M+1}$$

$$\text{Conf}_c = d - o$$

Variables have varying states of configuration security:

$$\text{Conf}_{Low}$$

$$\text{Conf}_{Moderate}$$

$$\text{Conf}_{High}$$

The easy answer to reducing the attack surface, and thus nervousness, is to turn off unnecessary services, especially the services that users do not need critically or often. (M. Howard, 2004) As an alternative approach, this model manipulates the attack surface size through incremental changes in configuration, such as open ports and patch updates, based on dynamic feedback through localized feedback and local policy (Paranoia). Each configuration state yields different postulated outcomes of attack surface size based on configuration, nervousness, and paranoia. The model allows a user to compare relative node nervousness against prior state nervousness as a measure of goodness:

$$A_n = \text{conf}_m \cdot \text{Nerv}_n \cdot \text{Par}_m$$

$$A_{n+1} = \text{conf}_m \cdot \text{Nerv}_{n+1} \cdot \text{Par}_m$$

where $$A_n \leq A_{n+1} \text{ or } A_n \geq A_{n+1}$$

Finally, node nervousness (A) is a combination of node configuration (attack surface), nervousness, and paranoia, using primitive local awareness of a node's immediate environment to calculate the immediate nervousness at a specific point in time. For this invention, the calculation is equal-weighted multiplication of configuration, nervousness, and paranoia.

Each node has a two-tuple state machine of node nervousness A=<S,F>, however this example will only calculate nervousness for a single node. Following the model above, system state s is a measure of conf configuration from 0-1 for this specific step in time, based on number of ports and services, and length of time since last patch, update, and administration policy push. This value is the attack surface. Then system feedback f is calculated based on the sum of immediate neighbor nervousness, times the paranoia scaling factor, thus network nervousness is computed:

$$\text{Nerv}_{m+1} = \Sigma_A^E \text{Nerv}_m$$

And this is multiplied by the individual nodes paranoia scaling factor (between 0 and 4) to calculate the modeled node m feedback:

$$F : \text{Nerv}_{m+1} \cdot \text{Par}_{m0}$$

Finally the node nervousness is computed as the system configuration attack surface times the network nervousness times the host paranoia:

$$A_{m+1} = \text{conf}_{m+1} \cdot \text{Nerv}_{m+1} \cdot \text{Par}_{m0}$$

Or $$A_{m+1} = \text{conf}_{m+1} \cdot (\text{Nerv}_A + \text{Nerv}_B + \text{Nerv}_C + \text{Nerv}_D + \text{Nerv}_E) \cdot \text{Par}_{m0}$$

Note that in this model, Paranoia remains fixed for a node throughout the lifecycle, and only changes as a change in the variable independent variable.

The current embodiment includes only one network pheromone that communicates nervousness. However, this invention also incorporates alternate primitive communication signals, such as a "calming" pheromone, may be provided for interactions and behaviors. Ant colonies use multiple communication mechanisms, including stigmergy, touch, frequency and concentration of interaction, and pheromone communications. The use of a "calming" or "safe" signal is represented in ant colonies and can be used here, which use multiple pheromones and combinations of pheromones for more complex communication and memory storage. This invention could be used in multiple embodiments with network stigmergy to include nodes dynamically adjusting their environment through network device rule sets, such as firewall rules, network segmentation, routing rule sets, and IDS alerts.

Application

The present invention provides an elemental construct for networked environmental assessments, and is widely applicable. The invention provides emergent systems to reduce attack surface and increase the defensive network posture. The invention can be used in multiple illustrative non-limiting embodiments requiring near node nervous communications.

One of the challenges addressed by the present invention is the lack of visibility within large, distributed, heterogeneous environments. Visibility in a networked environment is the ability of an administrator to have situational awareness of their current environment, meaning they know the location of their information assets or devices, and the current security status of those assets. This is a necessary capability under current network management, to direct hosts to change configuration, security posture, and attack surface. However, this is increasingly difficult in a large networked environment, where each local environment may have different types of security challenges and threats. This invention also allows hosts to monitor and trigger alerts based on their local environment, which can be reported back to the human administrator for analysis of whole system behavior. By pushing defensive decision closer to the hosts, this innovation helps to make security decisions proactive to imminent or ongoing threats rather than reactive based on prior-reported events.

Information security applied to computer and network security traditionally focused on a single host in isolation, defining a security boundary and base lining controls for a single host, and centrally managing the host policy and configuration. However, this model does not scale well with the rapid and continued growth of networked devices, including mobile phones, smart grids, personal computing devices, and network enabled devices. The present invention uses local environmental primitive awareness in network nodes to make large scale networks security management more effective and efficient. Several non-limiting illustrative embodiments are discussed below to establish a "security ecosystem" for security management in a large heterogeneous network, acknowledging the increasing sophistication in threats, complexity of defense, and growth of the attack surface to be defended. A security ecosystem recognizes that machines are needed to deal with threats from other machines in machine-time, and humans are needed to deal with threats from other humans in human-time. The present inventions enable each node to contribute to the security management challenge by creating a capability at each node that continually assesses the operational environment and makes decisions based on that assessment regarding its operational profile. Additionally, reducing the attack surface reduces the overall system complexity.

Network Defense

In one non-limiting illustrative embodiment, the present invention is applicable to endpoint or node management to increase the defensive security posture when endpoints are uncontrolled or unmanageable from a central command and control capability. Additionally, this invention can be utilized in endpoint or node management for large networks, where traditional centralized or distributed endpoint management solutions begin to break down due to the loss of visibility. In both scenarios emergent behaviors for network defense support but does not supplant other distributed network management systems. This automated reduction in attack surface is frequently accomplished by implementing basic information security hygiene, such as turning off services or ensuring patches and configurations are at their latest published level.

There are quite a few specific applications within a large unmanaged networked environment, including operating system vendors such as Microsoft and Apple. Also included are mobile phone carriers that provide internet enabled mobile devices. These devices are interconnected on a shared networked environment and receive updates from a central managed service, but the ultimate management decisions fall to the end users. Examples include infrastructure providers such as Verizon, ATT, and Spring, software providers such as Google, RIM, and Apple, and hardware providers such as Samsung, Motorola, and Apple.

Additionally, this invention applies to any software or hardware vendor involved in the management of a large number of distributed nodes, such as enterprise network management companies like IBM, internetworking companies like Cisco, endpoint management vendors such as Endpoint and Alteris, and security companies such as McAfee and Symantec.

The level of security hygiene may be monitored continuously centrally through an aggregation capability, even though the endpoints continue to communicate with each other through the nervous network. This hybrid approach allows for an enterprise-wide view of a risk assessment.

This invention is applicable to managed computer networked environment, such as one that uses distributed network management (DNM) solutions for centralized node patch and policy management. These may include solutions built into Operating Systems, such as Microsoft Active Directory, or add-ons for endpoint management like Altiris or Big Fix, or endpoint information security solutions such as McAfee or Symantec. This invention could augment and substitute a DNM solution. Additionally, and more importantly, this invention operates as a new capability or enhancing current nascent capabilities for unmanaged computer networked environments that do not use a centralized DNM solution, but where each node must choose independently when to patch and what policy to deploy. This is commonly used in personal computing, mobile computing, personally owned devices, or large enterprises with weak DNM deployments.

The primary new product that would result from this technology is an enhanced network management capability integrated to existing network management capabilities to assist information system managers to enable management decisions in computer-speed rather than human-speed time.

For example, take the specific implementation of a consumer mobile phone network. Most consumer mobile phones are purchased and maintained by a consumer as a private device. The consumer has the responsibility to at least: pay the bill, charge the device, register the phone on a network, keep the device physically secure, upgrade the firmware, operating system, and application software, and practice good security behavior. Good security behavior includes but is not limited to: performing proper password selection and storage, having awareness of their surroundings, considering other networks and devices they may connect to, and properly using their device so as to not cause harm to: their device (such as malware infection), themselves and others (such as causing an accident through distracted driving), their peers and friends (through sharing malware or posting malicious content to social media), and the network carriers they use (such as abusing the network, violating their terms of service).

However, consumers are neither skilled nor interested in performing these and other necessary security activities. As a result, some are performed by their network service provider, or in some cases such as smart phones (Android, iOS) a third party service provider will offer a limited number of security services (backup, patching, password protection).

In cases such as a corporate-owned mobile device, several of these functions are controlled by the central server which sets policies, pushes patches, checks for malicious activity either going to and from the device, or existing on the device, and configuring the device based on corporate security policies. However, even in this environment a centralized server may not know specific details about the immediate environment for every mobile device at all times. Additionally, the server connection may be lost due to geographic (out of the country) and environmental (underground, interference) factors. Any response directed by the server will have a communication time lag depending on availability and bandwidth.

The application of the present invention to the mobile phone example above alleviates a number of these challenges, by either making them more tractable through alerting human administrators, or removing the human user altogether through environmental awareness and automation.

For example, a node embodied as a mobile phone in this network will have some element of awareness of its surroundings. Other than paying the bill and charging the device, a mobile phone on an emergent network will have the capability to:

Ensure it is registered to the network, or in the case of signal loss, if configured and within range of other network devices, pass communications through peer devices as a mesh mobile network. If no neighbors exist, either because they are not part of the emergent network or because none are in range, the phone will appropriately not communicate with untrusted peers.

Have an awareness of its physical environment, based on immediate environmental factors of GPS, accelerometers, signal strength, and neighbor proximity. This can be used to indicate if a phone is stolen, such as if located in a physical area where not usually used or allowed.

An emergent phone node has the ability to perform firmware, operating system, and application upgrades based on immediate environmental factors, rather than waiting for a timed upgrade activity. This may include awareness if neighboring nodes are currently performing upgrades to check if one is available. This also includes if a nervous threshold is reached, and the node checks for updates to reduce attack surface.

Good security behavior cannot be forced on the user, but an emergent phone can assist the user in making better security decisions. These include limiting sending clear text or displaying (not marked out with *** while typing) passwords when in less secure environments. Sensitive activities such as checking your bank account may be limited when in densely public areas, such as on a bus, where other emergent nodes indicate a high number of neighbors.

Probably one of the greatest benefits in the specific example of mobile phones is the protection of others. An emergent network relies on the survival of the community through a healthy ecosystem. As a result, an emergent network naturally has a desire for self-preservation. Though not anthropomorphizing technology, survival based on awareness of surroundings is an easily configurable and implementable characteristic. For example, an emergent phone may not operate while the user is driving, it may not allow the user to access certain services when infected with malware that may spread to other users such as tweeting malware. Network abuse users, such as high volume downloaders, may be self-limiting if the network is under strain, or peers may indicate a node should self-limit, or the peers may selectively choose to self-limit a node.

Finally, an emergent mobile network is not limited to just mobile phones in this example. Nodes include the cellular towers and back-end equipment, wireless routers and switches, Bluetooth enabled devices, and any other technology with which the mobile phone may communicate. An emergent mobile network has additional advantages for rate limiting during times of high use, such as sporting events or degraded network availability, such as natural disasters. These properties enable an emergent mobile network to remain more resilient and survivable when exposed to adverse situations, and able to respond to situations automatically to provide greater availability to nodes or specific nodes granted priority.

Network Governance

This invention also embodies other applications for near node nervous communications, such as:

Reputational voting, trust-worthy voting, or even shunning. As nodes make judgments about their current environmental awareness, they provide a valuation mechanism to evaluate the trustworthiness of their counterparts. One example is the selection and elevation of a control server, such as Windows Active Directory environments with an unresponsive domain controller, and peer-to-peer communication systems that require interconnectivity with a bridged network. In all of these scenarios, the nodes create value judgment on other nodes, including choosing to shun or ignore data from those nodes.

This invention incorporates the modeling for complex simulations, such as new models to influence internet governance based on real-time geo-political scenarios and situations, such as natural disasters, civil war, embargos and sanctions. More rapid governance decisions based on a set of pre-existing rules can benefit from the model and this invention.

This invention incorporates financial modeling, or even operational optimization according to some defined set of criteria, to make use of a model. Economics or econometrics consider the cost-benefit tradeoff analysis and efficiency considerations. The application of game-theory, zero-sum and non-zero-sum games is possible, as well as cybernetic theory. The level of resource expenditure can be maximized or security activity from a game-theoretic or economic standpoint can be optimized; certainly the primitive communication of network pheromones exacts a network resource utilization toll. This includes the additional investigation into game theory and economic analysis, as well as the Nash Equilibrium and game theory constructs to apply cost-benefit tradeoff analysis and efficiency analysis to a decentralized network management ecosystem. One example of this is where the node is a financial transaction in a database.

Finally, this invention could incorporate considerations for insider threat of deception or malicious insiders, and certainly the primitive network communication mechanism is subject to manipulation. Indeed, biological systems are subject to the same threats from parasites, diseases, and slave-making. (Franks & Sudd, 1987) By design, no authentication mechanism is included in the present network communication mechanism. This enables a more open, robust, scale-free network, but introduces vulnerabilities through the exploitation of trust. If the system is large enough, with enough participating nodes, any single malicious insider node would not be able to manipulate the entire ecosystem. However, with the growth of botnets and other large scale control mechanisms, this is not a valid assumption.

The specific implementation of the invention may vary within each architecture and organization, but the fundamental element is the same. As endpoints query a server in a managed environment, or provide user feedback in an unmanaged environment, the emergent capability demonstrated in this invention can be incorporated within these products to improve the defensive decision making process. Most prominently, this invention is most needed in the uncontrolled endpoint environment, where currently no vendors make dynamic attack surface decisions based on local environmental situational awareness.

The System

This invention provides self-organizing multi-agent systems to enable computer nodes on a network to contribute individually to the collective management of security for a network. This invention is described in a series of three building blocks, each one builds on the other in capability and granularity. Block One (shown in FIG. 5) describes the characteristics of a single node. Block Two (shown in FIG. 7 as a collection of 5 Block Ones) describes the interactions of five nodes communicating with neighbors, but not yet through network pheromones. Block Three (shown in FIG. 9 as a collection of 18 Block Ones communicating as shown in Block Two) describes the emergent characteristics based on the interactions of eighteen nodes communicating with their nearest neighbors through the use of network pheromones. The output of Block Three is an emergent network for defense.

This invention enables the participation of network nodes for network security management, by considering primitive self-awareness, such as a node self describes its current security posture and local network environment as a state termed "nervousness". Each node assesses its current profile and neighbor's profile, using primitive communication, termed "network pheromones". This assessment uses a set of pre-determined hygiene rules set by the administrator. A successful response includes changes in the node's state, set through rules used to modulate its nervousness state in response to its environment.

FIG. 1 (Network Nervousness Assessment) demonstrates the primitive communication mechanism and state change iterated for each node. As shown, an emergent network is iterated through four steps (labeled 102, 104, 106, 108) of nervous communication. The network is shown having eight nodes 110 (each node is represented in FIG. 1 as a small circle) with a circle around each node that represents the area of nervous influence by each of its nearest neighbors. The figure illustrates a single node ($110_5$) of these eight nodes as it changes its level of nervousness from none through low, moderate, and high nervous states as represented in FIG. 6. Each node shares its level of nervousness with neighbors, and then reduces its level of nervousness by reducing its attack surface. As shown by the circle around it, the node ($110_5$) is neighbors with only one node, namely node ($110_6$). However, node ($110_6$) is neighbors with three nodes, namely node ($110_7$), node ($110_8$) and node ($110_5$). Node ($110_9$) has no neighbors.

Note each step (102, 104, 106, 108) is a step-wise simulation, each state must wait until the next step to change state (as a progression over time). In the first step (102), the node ($110_5$) has low nervousness and node ($110_6$) has no nervousness. Then in step (104) the nearest neighbor node ($110_6$) has received an elevated nervous pheromone from ($110_5$) and increases its own nervousness to low. Node ($110_6$) increases to low nervousness and releases its own nervous pheromone. Node ($110_5$) nervousness also continues to increase to moderate, and that node ($110_5$) releases its nervous pheromone. In step (106) the original node ($110_5$) has increased nervousness to high, and continues to release its nervous pheromone causing node ($110_6$) to elevate nervousness to moderate. Nodes ($110_7$) and ($110_8$) receive the nervous pheromone from node ($110_6$), but not node ($110_5$) (since nodes $110_7$ and $110_8$ are not neighbors to node $110_5$), and they now increase their nervousness to low.

Finally, in step four (108) the original node ($110_5$) has performed some action (patching, updating, closing services) to reduce its level of nervousness. Nodes ($110_7$) and ($110_8$) have increased nervousness due to nervous pheromones from node ($110_6$) and from each other. However, node ($110_9$) does not change nervousness because it is not a local neighbor. In this example, the initial conditions (attack surface, level of nervousness) of the hosts are all identical. The attack surface is a surrogate variable calculated to express the magnitude of the potential for security problems in a system. It is a way of discussing the security controls and vulnerabilities in a system without having to define each and every problem.

If the example were to continue to the next period in time with a step five, it would show that node ($110_5$) is not necessarily made more nervous by node ($110_6$) being nervous because node ($110_5$) now has higher defenses. Node ($110_5$) does not calm node ($110_6$), but may cause node ($110_6$) to stay at its current level of nervousness rather than moving to a higher level of nervousness.

The initial conditions of the hosts, the variables used to influence interaction, and the patterns of interaction all influenced the emergent characteristics. FIG. 2 (Systemigram for Emergent Network Defense) demonstrates this concept graphically through a Systemigram, documenting the system engineering design flow leading a system of emergent network defense. Systemigrams are based on text descriptions of a system engineering function, and the graphic can be read through as a paragraph and fully represented. The Systemigram shown in FIG. 2 is not intended as a procedural checklist or tactical description, but to provide a non-limiting illustrative embodiment of the invention. The Systemigram in this example is read graphically from upper left to lower right and can be read through multiple variations and enables graphical communication of a complex interrelating system dynamics model. (Boardman & Sauser, 2008). All operations move along all branches simultaneously as they define elements of the environment.

Characteristics of the Systemigram can also be generalized for easier understanding. Definitional Elements 1, 2, 11, 19, 21, 23, 25, 27, 37, and 43 are all definitional characteristics of a host at a discrete point in time. Each of these elements could be stored, determined, and originate from different areas as specified in the environment. Counts of neighbors are stored in the system itself, and represented on FIG. 8 as S6. These are determined by counting the number of nodes within a node circle in FIG. 1. They come from existence in the system, by definition. A host has, needs, or receives each of these to define its immediate state.

The F4: Attack Surface Oval (12) represents the basic operational capabilities used to represent the attack surface. The attack surface (F4) comprises S1, S2, S3, S4, S5. These are the minimal security controls that are implemented on a system to maintain a minimally acceptable security baseline, known as "security hygiene." The Emergent Characteristics (10) represents an elemental set of *agile* system characteristics termed SAREPH, as discussed by R. Dove, *Pattern qualifications and examples of next-generation agile system-security strategies*, Presented at Security Technology (ICCST), 2010 IEEE International Carnahan Conference, 2010, the entire contents of which are hereby incorporated by reference.

The SAREPH *agile* security pattern includes: (S) Self-Organizing, as the most important system characteristic to respond to adversarial attacks; (A) Adaptable Tactics, to reorganize and reconfigure in response to an attack; (R) Reactive Resilience, to operate and respond in a world of unknowns, absorb the shock of an attack and respond; (E) Evolvable Strategies, to modify behavior through tighter learning loops; (P) Proactive Innovation, to create new and novel defensive and attack techniques; and (H) Harmonious Operation, to establish usable, synergistic security characteristics to interact with both the users and other nodes within the environment. Each of these six characteristics exist to enable an emergent system.

Feedback Elements F1, F2, F3, and F4 are used to create the state machine through feedback loops. Data Elements S1, S2, S3, S4, S5, S6 are used to compute the host's current state, and to provide input to the feedback loops. Each data element is required for various building blocks of the implementation, as identified in FIG. 10. FIG. 10 demonstrates that at Block One, only F4, S1, S2, S3, S4 and S5 are required to operate. However, at Block Three, all data elements are required for operation. It also provides definitions of each.

Referencing Block One, FIG. 5, the host contains the processor. The host computes and manipulates the F4: Attack Surface, through S1: Agent Exists (20), S2: System Defense Updates (22), S3: System Baseline Updates (24), S4: Inbound Services (26) up or down, and S5: Outbound Services (28) up or down. The host also computes its F1: Internal Nervousness (7), based on F3: Paranoia (3) and F2: Network Nervousness (5). Block One also incorporates F2: Network Nervousness (5) inputs, but until incorporated into a network with nearest neighbors, these are irrelevant.

Referencing Block Two, FIG. 7, the host contains the processor that computes all functions performed in Block One (FIG. 5), plus computing F2: Network Nervousness (5) by network pheromones from S6: Neighbors (15). This is the full embodiment of the characteristics of a single host. As discussed below, FIG. 7 is a Theoretical Context Diagram for Block Two and provides additional details. Block Two represents a full model implementation based off the initial concepts learned in Block One (FIG. 5). Block Two incorporates several initial characteristics, that the full model was autocatalytic, meaning the model was self-sustaining.

Referencing Block Three, FIG. 9, the network has emergent characteristics (FIG. 2, 10) embodied in the interaction of each host which creates the Emergent Network Defense (FIG. 2, 18). This is not embodied in any single host, but is an emergent property of the network.

Turning back to FIG. 2, a detailed description of each element in the Systemigram is provided including a description of the function at each element. The feedback elements F1, F2, F3, and F4 are used to create the state machine through feedback loops. The data elements S1, S2, S3, S4, S5, S6 are necessary for computation of the host's current state, and used to provide input to the feedback loops.

Element (200) is a node element, such as a host on a network. The node element (200) can be, for instance, a computer or an electronic device having a processor (such as a mobile phone, PDA or the like). It can also be a data element (such as a storage area), and multiple data elements can be controlled by a single processor or CPU. The node element (200) has an attack surface. FIG. 2 depicts the functions that take place on the host and as the host interacts with its nearest neighbors and immediate environment.

Definitional Element (1) applies when the host has (1) a quality of F1: Internal Nervousness, as a variable computed in its state machine. Definitional element (2) applies when the host has (2) a quality of F3: Paranoia as a variable.

Feedback Element F3: Paranoia (3) is a scaling factor, a variable set by policy. This policy is usually set by a human administrator as a function of what the node is supposed to do. For instance, is the node in a high risk or low risk environment? A closed environment with low likelihood of threats may have low paranoia, while an open environment with many threats may be more "dangerous" and require a higher level of paranoia. Paranoia affects both F1: Internal Nervousness and F2: Network Nervousness simultaneously.

Feedback Element F3: Paranoia (3) multiplies (4) F2: Network Nervousness, to scale the importance of the immediate network environment as quantified by F2: Network Nervousness. Small changes in network nervousness may matter little or a great deal, and hence affect the network nervousness weight a little or a lot. Additionally, the weighting of network nervousness affects how emergent characteristics evolve. A network with much paranoia may be so nervous all the time that it is paralyzed, requiring a reduction in paranoia or attention by the administrator for systemic changes.

The F2: Network Nervousness feedback element (5) is the computed nervousness of all the nervous pheromones of nervous neighbors in the host's local environment. For the purposes of this embodiment we incorporated basic additive and multiplicative computations, though other modeling and calculation models may be incorporated specific to the implementation. The inputs to F2: Network Nervousness (5) are F3: Paranoia (3) and S6: Neighbor (15) nervous pheromones. Multiply the aggregate neighbor pheromones to get the current network nervousness. This is what affects the internal nervousness and the existence of it in the network enables emergent characteristics.

The F2: Network Nervousness (5) computation then affects (6) the F1: Internal Nervousness (7) through a predefined computation algorithm (noted in the Model section above) using weighting from F3: Paranoia and the F2 computation. The F1: Internal Nervousness (7) is the variable that describes the level of nervousness computed by the host. This is how nervous the host "feels" considering both F2: Network Nervousness and F3: Paranoia. The objective of the host is to reduce F1: Internal Nervousness through multiple mechanisms, such as reducing attack surface or limiting risk exposure. The F3: Paranoia (3) also affects (8) the F1: Internal Nervousness as a scaling factor set by policy.

The computation of F1: Internal Nervousness (7) and the objective to reduce nervousness is a simple element within a single node, with no centralized control, which when combined with other hosts, as defined in swarm theory, enables (9) emergent characteristics. This is the fundamental principle of this innovation, that a representation of nervousness models eusocial animals to enable emergent network defense.

Emergent characteristics are shown as element 10. The SAREPH agile security pattern includes: (S) Self-Organizing (40), as the most important system characteristic to respond to adversarial attacks; (A) Adaptable Tactics (34), to reorganize and reconfigure in response to an attack; (R) Reactive Resilience (46), to operate and respond in a world of unknowns, absorb the shock of an attack and respond; (E) Evolvable Strategies (42), to modify behavior through tighter learning loops; (P) Proactive Innovation (36), to create new and novel defensive and attack techniques; and (H) Harmonious Operation (41), to establish usable, synergistic security characteristics to interact with both the users and other nodes within the environment. *Agile* characteristics, like any self-organizing multi-agent system, appear to the untrained observer as a complex scenario.

The host also has (11) the property of an attack surface with variables S1, S2, S3, S4, S5. The F4: Attack Surface (12) is the data used to compute the input for the attack surface. These characteristics are the security hygiene elements are the minimum used to support a computation for an attack surface. The F4: Attack Surface (12) variable is used to provide input (13) to compute internal nervousness (7), and is computed by taking S2, S3, S4, and S5, S2 and S4 averaged together to define the "internal state average surface exposure" variable. S4 and S5 average together to define the "network state average surface exposure" variable. Both the network and internal state average attack surface average together to define the overall F4: Attack Surface. This means that if one variable increases, such as internal state, and another variable decreases, such as network state, the average attack surface exposure remains balanced. Following the model referenced earlier, the node state s is representative of the attack surface, and includes both internal attack surface and network attack surface, combined to one measurement for this model to maintain configuration of resources. Note the attack surface (12) is not affected (13) by paranoia, because the current security posture is a known state, exclusive of threat input. The existence of an agent through the S1: Agent Exists (20) variable is not included in the attack surface computation because if the agent does not exist, the node is not a member of the emergent network and cannot perform nervous computations or share network pheromones. Consideration for threat input is captured in the nervousness calculation.

In accordance with an embodiment of the invention, the emergent characteristics (10) must exist and be common among (14) all neighbors. This is also demonstrated in Block Three (FIG. 9). The S6: Neighbors data element (15) is the nearest neighbors of similar hosts, which must exist in some quantity to enable emergent characteristics. Emergent characteristics, including emergent network defense, only emerges if there is a sufficient number of hosts (preferably at least about 15, though could be more or less depending on the application) able to communicate with each other to enable (16) the emergent characteristics. A host alone is like an ant alone—weak, uninteresting, exposed to multiple threats, extremely vulnerable, and at high risk. The successful development and demonstration of emergent characteristics is what creates (17) an emergent network. A network of similar hosts with emergent characteristics is what becomes an emergent network for defense (18). This is the resultant system that embodies emergent characteristics through all building Blocks One, Two and Three.

A host (200) must have (19) an agent or computational element located locally to compute its internal state. The element to compute current state is identified as variable S1: Agent Exists (20), which identifies a host as part of the emergent network. A host (200) must have an agent to be part of the swarm and to calculate nervousness. A host (200) without an agent is unrecognized, which may mean communication is shut off from other hosts. In some cases a host without an agent will be coerced to install an agent, quarantined until an agent is installed or removed, or isolated from all other hosts and control points within the network. The existence of an agent (or lack thereof) on self and nearest neighbors is an input to attack surface computation and to internal nervousness.

The host requires (21) system defenses. S2: System Defense Updates (22) include signature updates to security devices and security policy. This includes Anti-Virus, Intrusion Detection and other signatures, security tools, and system and application patch level. The host configuration must (23) be maintained. The S3: System Baseline Updates data elements (24) determine the difference between a preconfigured host policy and the current host configuration, such as current software installed, current application configurations such as enabled features, current system configuration such as hard drive encryption, geolocation, number of users allowed, user actions performed, the current configuration of system defenses such as firewall configuration and anti-virus sensitivity, and many other system baseline configurations. These are not usually thought of as system defenses because they are not reliant on the latest patch level or signature, but a constant configuration based on a predefined policy.

The host (200) allows other hosts to connect to it, which increases (25) its attack surface. The S4: Inbound Services data elements (26) include ports, protocols and applications a host has open and allows other hosts to access, query and connect. These may include peer to peer network discovery on a client host or services running on a web server. Inbound services are generalized and may include specific characteristics of an application running on a port, such as allowing certain users access to only limited application information. It is important to note this is not a binary decision to turn an inbound service "on" or "off" but can be changed dynamically through a range of options, including rate limiting, restricting access to certain data, feeding the requesting host false, misleading, deceptive or malicious data, and any other number of defensive tactics commonly used. False indicates not 100% correct data; misleading is for data that is factually correct but intentionally altered in the way it is presented to lead to alternative conclusions; deceptive is for intentionally incorrect data meant to trick the user such as routing to an alternate service; and malicious is meant to be captured and perform some function on the remote host—maybe a beacon, maybe destructive.

The host connects to other hosts has the ability to increase (27) its attack surface, as recognized by S4 (26) and S5 (28). The S5: Outbound Services (28) includes ports, protocols, applications, that have access to various services both internally and externally to the immediate environment and local network.

The F1: Internal Nervousness (7) drives the update cycle time for S2: System Defense Updates (22). While most system defenses update (29) based on a regular schedule (hourly, daily, weekly) this schedule is manipulated by internal nervousness (7). The F1: Internal Nervousness (7) also drives changes (30) in the current S3: System Baseline Configuration (24). In addition to changing maintenance schedules, the current system baseline can change dynamically to reduce attack surface. This includes changing host policy based on geolocation, current user, current applications installed or configured, current data stored or transmitted on and through the host, current alerts from system defense tools, and other policy elements configurable by the host and server policy tools. The F1: Internal Nervousness (7) also decreases (31) the availability of S4: Inbound Services (26). Restrictions may include limiting bandwidth, geographic location allowed to access a port or specific elements on an application, allowing different users to access different instances of a hosted application or applications, such as showing different data to different users. This is discussed in the Model section above as a node state s∈S as a mapping of node resources to their configurations. In this case, resources include the restrictions mentioned above (bandwidth, ports) but is not exclusive to only those examples. Restrictions can include any element defined within the specific S1: Agent (20) that are appropriate and applicable to the current environment. As the node configuration changes through the Nervous Operator (NO), each node varies states of configuration security $Conf_c$: $Conf_M \rightarrow Conf_{M+1}$ from $Conf_{Low}$ to $Conf_{Moderate}$ to $Conf_{High}$ as show in FIG. 6.

The F1: Internal Nervousness (7) also decreases (32) the number of services allowed outbound (28) using the same algorithm (see Model section above) to map resources to configurations through the Nervous Operator (NO) to change the attack surface (10) based on the Nervous Assessment (NA). This can be used in current operational environments, where hosts are limited to accessing certain websites, send certain emails, and communicating over certain protocols. However, the options to further reduce outbound services include for instance, rate limiting host output, such as for botnet mitigation, restricting communication protocols such as Ethernet, WiFi, WiMax, BlueTooth and other Layer 1 protocols, in relation to system baseline updates.

By manipulating both S4: Inbound Services (26) and S5: Outbound Services (28) a host is able to dynamically adjust (33) its attack surface in a rapid fashion, more quickly than updating S2: System Defenses (22) and S3: System Baseline (24). This rapid response to dynamically manipulate what is allowed in and out of a host creates an Adaptable Tactic (34) for defense. Adaptable Tactics: Hosts (34) are able to modify defensive posture using simple rules, which determine their defensive posture and defensive activities. These include blocking specific sites or addresses, disabling services, and increasing update cycles based on inputs from neighboring hosts through network nervousness, even though specific knowledge of threats regarding these vectors may not exist.

A dynamically changing attack surface enables a host to change (35) its characteristics rapidly, which proactively supports the development of innovative defensive mechanisms. For example, using the Nervous Operator (see the Model section above), node configurations may increase or decrease their attack surface score independently. The internal attack surface (S2, S3) and network attack surface (S4, S5) average together to calculate the F4: Attack Surface (10). This means that if the internal attack surface increases, the network attack surface will decrease to reduce the overall attack surface (10). For example, this may happen if a node is part of a legacy system, where system upgrades and patching may break existing systems that cannot be upgraded to the most current patch level. The vulnerability of outdated S2: System Defense Updates and S3: System Baseline Updates would be mitigated by an administrator by increasing other security controls, such as network traffic. Using Emergent Network Defense, the agent on the node will attempt to decrease node nervousness by decreasing the attack surface, and specifically in this case node network attack surface. This example of attack surface manipulation will occur automatically as part of the process (see the Model section above) to reduce overall attack surface, without input from the human administrator as described above. This is an example of an innovative defensive mechanism in an emerging scenario that allows an emergent network to defend itself against threats not known, in new and unique ways possibly not considered previously. Additionally, hosts in an emergent scenario are more resilient to injected attacks and recovery than stand-alone nodes, due to the ability of neighbors to quickly warn each other to increase defensive posture before their nodes were targeted for attack. These are examples of Proactive Innovation (36) and defense. Proactive Innovation (36) provides that by using network nervousness, systems can slow their reaction and response time and eventually tightly restrict communication or disconnect from the network until the system is patched or other fix remedied. This is one emergent characteristic demonstrated in Block Two (FIG. 7).

The host (200) also counts (37) nervous pheromones received from its neighbors. A host must be able to receive nervous signals from its neighbors. If each neighbor releases one nervous signal at the same time, the host knows how many neighbors it has (counts). Network Pheromones aggregate (38) through a common broadcast medium to nearest neighbor hosts which also count the number of pheromones. Each host counts the nervous pheromones to provide input to compute F2: Network Nervousness (5) through algorithms such as those described above.

The F2: Network Nervousness feedback element (5) is computed and incorporated into host state machines, enabling (39) Emergent Characteristics (10) among nearest neighbors, as they share their individual internal nervousness.

The Self-Organizing characteristic (40) provides that the host (200) nodes perform self-organizing activities through local interactions within their environment, with no central policy control. The system responds more rapidly to attacks or environmental changes than would be performed by a human or centralized management system. The Harmonious Operation characteristic (41) provides that by relying on the same set of simple rules, reflecting the intent of good hygiene set by organizational policy, the nodes have a set of shared security goals and rules to communicate. Like ants, though they have no central control, they all have the same objective which enables a stable, resilient, and harmonious environment.

The Evolvable Strategies characteristic (42) provides that in order to not overwhelm an update server, many hosts under traditional security management models stagger their update cycles of 24, 48, 72 hours or more, or large networks will roll out host updates sequentially. However, if one host detects malware on its system due to a recent update, other hosts do not immediately check in with the server to get their latest updates. This reduces the cycles for patching when a critical update is available. This is demonstrated through this innovation, by reducing the cycles between patching, and by reducing the attack surface exposure.

The host is targeted (43) by threats (44), both natural (such as flood, fire, earthquake, squirrel) and man-made (such as hacker, thief, espionage, saboteur). If there are no threats, there would be no need for security, so threats must be >0. The present invention addresses threats (44) both known and unknown, present and not present, natural, man-made, driven by computer and by human command. Addressing specific threats is the root of many security failures, rather than addressing the root cause of system state and risk management. The present invention specifically addresses the local environmental primitive awareness in network nodes to make large scale network security management more effective and efficient. Effective security management means that potential attacks have a lower probability of achieving their goals, and uses a surrogate variable of (1) an attack surface for this calculation. Efficient security management means that responses to threats can be made more quickly through automated decisions based on local environmental assessments, using surrogate variables of (2) the speed with which action is taken, and (3) the speed in which a human operator is notified of a challenge. This is achieved through the application of emergent characteristics to the nodes, as detailed in the Model section above.

To address these threats, the invention responds (45) with Reactive Resilient (46) capabilities to enable operational success even in the face of attack and compromise. The Reactive Resilience characteristic (46) provides that hosts within swarms have an awareness of increased nervousness, due to increased attack surface, resulting in a dynamic change of host defensive posture. For example, an attacker may not trigger a known signature, but an increased attack surface will increase network nervousness across multiple hosts, increasing the level of nervousness, and hence, increasing defensive posture. As the defensive posture increases, the level of nervousness will decrease, returning the system to a steady state. While an attack may not be explicitly identified, the level of nervousness will modify the defensive posture to mitigate an unknown attack. The sensitivity to react to nervous neighbors may be modified by changing the "paranoia" level of the host. Paranoia (3) is a scaling quantity of how much a node factors in the nervousness of its neighbors into its own world calculation. The paranoia characteristic influences how responsive hosts are to their neighbors. The hosts compare themselves to the nervousness of their local network, using primitive communications, to share current state and keep themselves as healthy as possible, weighing the influence of their neighbors according to their paranoia level.

In one non-limiting illustrative example, the Systemigram could be read as: a Host (200) has (1) a level of F1: Internal Nervousness (7) and a level (2) of F3: Paranoia (3) which multiplies (4) F2: Network Nervousness (5) and affects (6) F1: Internal Nervousness (7). As discussed above, nervousness is a calculated value, while Paranoia is a policy based attribute. For example, Paranoia (3) could be set to "High" by an administrator in a Top Secret facility, while Paranoia could be set to "Low" in a Kindergarten. Walking down a street at 3 am, your paranoia would be much higher than at 3 pm, but the way you calculate nervousness remains the same, resulting in a higher nervous calculation. Additionally, F3: Paranoia (3) affects (8) F1: Internal Nervousness (7) and enables (9) Emergent Characteristics (10). The Host (200) has (11) an F4: Attack Surface (12) which affects (13) F1: Internal Nervousness (7) which also enables (9) Emergent Characteristics (10). These Emergent Characteristics (10) exist among (14) S6: Neighbors (15), which also enable (16) these characteristics (10), which ultimately create (17) an Emergent Network Defense (18). All of the characteristics exist, which is to say they emerge from the activities described (i.e., emergent behavior: when entities communicate primitive functionality, cooperative behavior emerges).

In another example, a single document can contain emergent properties as indicated from the SAREPH (10) framework and create an emergent network of document to document defense. Increasingly documents carry security attributes with them, such as encryption, user rights and privileges such as open, copy and print, and can be used to send and receive network data. Walking through the same Systemigram for Emergent Network Defense, a document possesses attack surface properties so long as the program opening the document supports these emergent properties. This can easily be addressed by encrypting the document and only allowing certain programs (Microsoft Word, Adobe Acrobat) to open the document. Defensive updates and Baseline updates include application version level and policies for document usage. Inbound and outbound services represent how users and other services interact with the document, to open, copy, print, reference, link to, extract data and so on. The document can possess an understanding of nervousness based on its immediate local environment, if it is within a known network or host, or in an unknown network with no other known hosts or documents with emergent properties. Fundamentally, so long as the software accessing the document supports emergent properties, this concept can be applied to any network-enabled agent-based system for emergent network defense.

This Systemigram can be applied to a specific use case for any emergent node, such as the emergent mobile network mentioned earlier. An example application could be: a mobile phone (200) has (11) an F4: Attack Surface (12) consisting of specific parameters of vulnerabilities as mentioned earlier. These include physical security, upgrading the firmware, operating system and applications, and practicing good security behavior. In this example, the mobile phone (200) must first have (19) an S1: Agent existing (20) on the phone to be part of the emergent network. This agent may be part of the firmware, operating system, or an installed application. This agent enables the nervous state assessment in FIG. 5. The mobile phone (200) also needs (21) S2: System Defense Updates (22) such as restricting features and capabilities to encourage good security behavior. Here, it is noted that every system requires periodic maintenance. For example, you have anti-virus software running on your computer. It is only as effective as the last time you updated your anti-virus dictionary. This used to be a problem until enterprises started pushing updates rather than waiting for users to pay attention and update their software. The "needs" (21) is determined when (a) a timer expires and (b) an update is available. Under an emergent system, "needs" is determined by nervousness, at which point the node checks for an update. If none is found (1 exists but 2 does not) then the node takes other actions (e.g., close ports) to reduce the attack surface and hence nervousness.

Continuing with the mobile phone example, the mobile phone (200) also needs (23) S3: System Baseline Updates (24) which include updates to the configuration, firmware, operating system, or applications. The host needs (23) updates to its baseline configuration. Updates (30) happen if one is available. Depending on the level of nervousness, the node checks for baseline updates, or manipulates its own baseline to decrease nervousness. As another example for a personal computer rather than a mobile phone, your computer needs periodic software maintenance, including security patches. For Windows, that happens pretty much once a month. For Macintosh, it's less frequent but you still need to download and install the patches to prevent some hacker from taking advantage of an unpatched vulnerability on your system. The calculation of internal nervousness is partly based on assessing how long it has been since periodic maintenance has been performed.

Finally, over time the agent on the mobile phone (200) will increase (25) the amount of S4: Inbound Services (26) made available to the user, allowing the user to receive more data and connections through the newly-available services (for instance, if the mobile phone is in an environment where it can receive text messages). These include services such as which types of wireless networks it will connect to, devices it will allow to connect (such as unpaired Bluetooth scans), services running on the mobile phone that allow other nodes to connect to it, and what types of messages it will receive, such as SMS, MMS, web, email, and phone calls. Specifically, the user may have SMS messages queued by their network and ready to receive to the phone, but the agent on the phone will not allow those messages to be received and displayed until the nervousness decreases the attack surface enough to allow S4: Inbound Services (26) to receive SMS messages. This currently happens when a mobile phone is in an environment without a signal, like underground or when their phone is turned off. In another example, there may be local Bluetooth devices available to connect to the phone, but the agent on the phone will not allow Bluetooth connections until the nervousness decreases the attack surface enough to allow S4: Inbound Services (26) for Bluetooth connections.

These examples are implemented in specific and granular instances depending on the specific host environment, such as a mobile phone or personal computer. The agent on the mobile phone (200) will increase (27) the amount of S5: Outbound Services (28) opened to the user, allowing the user to initiate more connections and send more data through the newly-available services. These include, for instance, services such as what websites a user may visit, types of messages they may send, and wireless networks and devices the mobile phone chooses to connect. Specifically, a mobile phone may be restricted from connecting to certain wireless networks, such as public unencrypted WiFi, unless the mobile phone is fully patched and secured to the level where nervousness is low enough to allow an increase in the network attack surface by allowing a riskier wireless connection. Once the phone is secured to a level that decreases nervousness to a level approved by the agent, and set by the current level of paranoia, the user is allowed to connect to the risky wireless connection.

We have discussed the host feedback activity of F1: Internal Nervousness (7), F2: Network Nervousness (5), F3: Paranoia (3), and F4: Attack Surface (12). We now address how responsive behavior as manipulating the F4: Attack Surface (12) through S2, S3, S4, and S5 affects (13) the F1: Internal Nervousness (7). As discussed previously, the attack surface is an aggregate variable of network attack surface and internal attack surface, thus incorporating attack surface exposure due to increased time since last checked for a system patch, and restrictions on inbound and outbound communication. The attack surface can be measured as a variance from an established baseline of good security hygiene, which includes the most recent updates, the latest patches, and the most restricted inbound and outbound services. As the attack surface deviates from good hygiene, it affects (13) the level of node nervousness, by increasing the F1: Internal Nervousness (7). This is computed by multiplying the current attack surface configuration by the level of F2: Network Nervousness (5, 6), and the F3: Paranoia (3, 8) scaling factor. This is computed in the Model section above as node A nervousness $A_n = conf_m \cdot Nerv_n \cdot Par_m$.

For example, if a node has a paranoia of 1, a network nervousness of 410, and an attack surface configuration of 0.17, the node nervousness would be 69.7 (i.e., 410×0.17=69.7). Specific to the mobile phone example, if a mobile phone may be set with a paranoia of 1, a relatively high network nervousness of 410, the mobile phone may attempt to reduce its nervousness by decreasing its attack surface to allow SMS messages but not MMS messages.

Following more generally, the F1: Internal Nervousness (7) then updates (29) the current S2: System Defense Updates (22) such as updating signatures. The F1: Internal Nervousness (7) also updates (30) the S2: System Baseline Updates (24) measured against current baseline policy. The F1: Internal Nervousness (7) also decreases (31, 32) the S4: Inbound Services (26) and the S5: Outbound Services (28) variables to counter the increase (25, 27) of service availability over time, mentioned above. The balancing of these services creates (33) adaptable tactics (34) that automatically respond to changes in the environment to maintain the desired level of nervousness, and hence, security. The calculation of the F4: Attack Surface (12) also supports (35) a proactive and innovative response (36) to threats by dynamically monitoring and adjusting the attack surface as a minimization function.

Finally, the remaining elements of emergent characteristics (10) can be considered to develop an emergent network defense (18) capability as discussed in Block Three, FIG. 9. First (in our example) the mobile phone (200) must count (37) its local S6: Neighbors (15) and use the aggregate to (38) compute the F2: Network Nervousness (5). This feedback enables (39) the emergent characteristics (10) by creating a feedback loop and enabling the nervous network to be self-organizing (40). This means that the nervous network is able to interact and exchange information independently without external guidance or direction. Additionally, the nervous network must operate harmoniously (41) by relying on the same set of simple rules and having a set of shared security goals and rules to communicate, and using evolvable strategies (42) through dynamic variables, such as the level of nervousness based on the immediate situation, rather than firm rules. Finally, the mobile phone (200) is going to be targeted by (43) threats (44). These threats may be physical, like theft, and digital, like hackers, and may target any element of the available F4: Attack Surface (12).

However, regardless of the threat (44) the mobile phone (200) will be required (45) to react resiliently (46). A Resilient Response (46) for a mobile phone to a threat, both known and unknown, fundamentally means the phone has certain characteristics that it will enable and continue to perform throughout its operations. For instance, it will have backup systems and non-essential functions that will be shut off so others can operate. For example, in a mobile phone the ability to dial 911 should always exist, regardless of carrier and subscription service. However, an emergent mobile phone network would also reduce the amount of network data and congestion allowed to support emergency phone calls (911), priority phone calls (GETS—Government Emergency Telecommunication Service), and WPS (Wireless Priority Service). Additional resilient issues include disabling pre-defined non-essential services, such as Bluetooth, Near Field Communications, and Peer to Peer WiFi. Reactive resilience also includes identifying essential and non-essential applications, depending on the situation. Non-essential may include games, while essential include phone, stem support, GPS, and certain messaging capabilities like Twitter and Facebook. Continuing down this specificity, Facebook applications may be made resilient to support a text-only feature (no pictures) if enabled by a phone with reactive resilience.

Thus, a reactive response (46) may include elevated nervousness of the mobile phone (200) due to its increased awareness of its S6: Neighbors (15) F4: Attack Surface (12), resulting in a dynamic change of mobile phone (200) defensive posture. For example, a threat (44) may not trigger a known signature, but an increased F4: Attack Surface (12) among all S4: Neighbors (15) will provide a more aggregated (38) view of network situational awareness and hence affect F2: Network Nervousness (5). More hosts (200) provide more opportunities for detection and shared responses across the network, by increasing the level of F2: Network Nervousness and enabling (39) Emergent Characteristics (10), which ultimately increasing defensive posture by creating (17) an Emergent Network Defense (18).

The term "local" refers to a predetermined closeness of said node to neighbor(s), measured by any of physical, logical, network hops, network link, or vertices analysis closeness. Consider an example with a center node and five nearest neighbors (A, B, C, D, E), as shown in FIG. 4 (Nervous Example). The dashed line represents an arbitrary determination of "neighbor" based on physical proximity. The center node computes its internal nervousness based on the aggregate network nervousness of A, B, C, D and E. The specific network architecture linking A, B, C, D, and E is not considered in this example.

However, FIG. 3 describes the challenge of network hops or network link or vertices analysis as a measure of network closeness. This figure shows two architecture representations, one based on network closeness and the other based on abstract closeness for nearest neighbor computation. Using physical closeness (distance) as a proxy for nearest neighbor closeness does not limit the application of this invention to a particular type of network architecture. Rather, the abstraction illustrates it is applicable to any architecture. The center node in the: Hierarchical architecture ($120_1$) has 5 neighbors; Partially Connected Mesh architecture ($120_2$) has 2 neighbors; Ring architecture ($120_3$) has 2 neighbors; Fully Connected Mesh architecture ($120_4$) has 2 neighbors; Star architecture ($120_5$) has 2 neighbors; Bus architecture ($120_6$) has 2 neighbors; Wireless architecture ($120_7$) has 3 neighbors (including the router). The abstracted architecture fits the same need for the purpose of this example and embodiment. The abstract architecture $120_8$ has 0 neighbors, the abstract architecture $120_9$ has 2 neighbors, the abstract architecture $120_{10}$ has 4 neighbors, and the abstract architecture $120_{11}$ has 5 neighbors.

This diagram illustrates that with respect to network architecture, closeness geographically and closeness logically are not always the same. Hence, to abstract in the general sense, this embodiment represents locality through geographic closeness, while the specific implementation will use logical closeness. The specific number of network links is not studied or modeled for this simulation, thus the link analysis is removed and the number of nearest neighbors within a radius of each node is used as a surrogate variable instead.

Below are some of the node capability and characteristics identified as part of Block One of FIG. 5. Node capability assumptions are based on node hygiene characteristics, modeling nervousness and attack surface through the node state machine, as computed in Block Two of FIG. 7. These capabilities and characteristics apply to the Block One model in FIG. 5, where each node receives inputs of nervousness from their environment, and makes a localized determination as to the nervousness level of the individual node. This level of nervousness is shared with the local environment, without regard to which other nodes may receive this nervous input.

Referring to Block One (FIG. 5), the node grows more and less nervous based on its Current State Assessment (500). This state assessment is a calculation (see model section above) to compute the host state (502). The host state is a combination of the attack surface, network nervousness, and paranoia as a scaling factor. Computation of the host state (502) for attack surface is based on the following characteristics. (a) The node grows more nervousness as time increases since the host was last manually updated or automatically checked with a centralized patch server to get a patch to critical applications, such as firmware patches, Operating System patches, application-specific patches, Anti-Virus updates, and Intrusion Detection System signature updates. (b) The node grows more nervousness as time increases since the last time the host checked in with the configuration management server or administrator last manually logged in to the host to check on current local policy configurations. Configuration checks may include allowed and blocked ports, protocols, services and applications. It may also include restrictions on who can log in, what functions they can perform, what data they can send and where they can send it. (c) The node grows more nervousness due to activity that triggers an "alert" for suspicious events. These may include users attempting to access files they are not authorized, sites that are blocked, shares that are restricted, during times outside of normal work hours, and from locations not usually used. (d) The node grows more nervousness due to signature or heuristic activity that triggers local IDS or Anti-Virus alerts. (e) The node becomes less nervous as the node receives patches and updates within a set timeframe, or assurance that no patch is available. The node becomes less nervous when updated with the latest malware and threat signatures.

Initial attack surface assumptions aggregated attack surfaces across all nodes, for a holistic view. This invention generalizes the attack vector to model a generic endpoint configuration for use in a simulation environment, accounting for a reduced set of common endpoint security capabilities. Surrogate variables approximated the as a single attack surface composed of internal attack surface and network attack surface. For example, a single variable for time represented patch updates for OS and Applications, signature updates for AV and IDS, and policy updates as an internal attack surface group characteristic. A single variable for network services represented the running services on the host (inbound queries) and destination address restrictions (outbound requests) on the local host.

Next, computation of the network nervousness is based on adding up nervous signals (503, 504, 505, 506) received from neighboring nodes, which contain abstract, nonspecific data. These signals may be transmitted on the broadcast domain of an Ethernet network, as an associate signal in a wireless network, or through local proximity through other common carrier signals. The broadcast domain only needs to represent the closeness or locality of a network, either physically or logically. Signals are summed with three nervous signals (503, 504, 505) and one OK signal (506) which when added together equals three out of a possible four level of nervousness. This is multiplied by the attack surface and paranoia level by the state assessment (501) to calculate the host state (502). In this case, the host is nervous, and transmits its own nervous signal (507).

A state change from one state to another is depicted in FIG. 6 (State Change), where state one (601) is calm and open to communication, state two (602) is some measure of nervous, and state three (603) is so nervous that a system temporarily closes off most or all communications until nervousness decreases.

Block Two (FIG. 7) incorporates the Block One model in a more robust environment, depicting five nodes (701) in FIG. 7. This block includes the full implementation within NetLogo to embody this innovation using 1,000 nodes. The second block of this model demonstrates the interaction between multiple nodes, framed by their affected node state based on local awareness. System feedback includes the communication of the level of nervousness shared with nearest neighbors (702) within a specified physical distance, and the level of sensitivity to neighbor nervousness, termed paranoia (703).

FIG. 7 is a Theoretical Context Diagram for Block Two and provides additional details. Block Two represents a full model implementation based off the initial concepts learned in Block One (FIG. 5). Block Two incorporates several initial characteristics, that the full model was autocatalytic, meaning the model was self-sustaining. It was also during Block Two that the paranoia variable was refined from a scaling factor affecting nervousness to a weighted multiplier to indicate how much each node factored the nervousness of their neighborhood network nervousness.

Variables and parameters used in the simulation differentiate between agent-based variables and environmental variables. Agent-based variables are specific to an individual node, and environmental variables apply equally to all nodes within the simulation. Table 1: Agent Based Variables and Table 2: Environmental Variables show which variables and parameters are exported, and the corresponding data elements.

TABLE 1

Agent Based Variables

| Agent Variables | Definition | Exported |
|---|---|---|
| Who (Default) | Unique identifier for each individual node | Yes |
| network | The level of network attack surface, scaled from 0-1. Surrogate variable for S4, S5. Network attack surface can increase and decrease by varying amounts, depending on settings as a measure of how quickly nodes open/close network ports, services, and addresses. | Yes S4, S5 |
| nervousness | Level of nervousness at a single node, from 0-100. Nervousness = attack-surface * F2-network-nervousness*Paranoia) | Yes F1 |
| nervous-state | Defined states of nervousness: (1) Calm; (2) Nervous; (3) Max. When a node reaches (3) Max it will either attempt to patch with the server and close ports to decrease nervousness, or stop communications until nervousness decreases. | No |
| internal | The level of internal attack surface, scaled from 0-1. Surrogate variable for S1, S2, S3. Internal attack surface increases steadily since the last time it was patched, and is patched on a regular schedule either (1) set by the administrator, or (2) set based on level of nervousness, or (3) based on a detected alert. | Yes S1, S2, S3 |
| F2-network-nervousness | Level of nervousness of nodes within each node's radius, surrogate variable for local nodes. Calculated either through mean or average, depending on setting. | Yes F2 |
| alert-detection | Manual inject of alert detection, which forces an update and sets node to highest level of nervousness. | No F5 |
| attack-surface | Overall node attack surface variable, composed of internal + network attack surface variables, scaled to between 0-1. | Yes F4 |
| myneighbors | Number of neighbors within node radius. | Yes S6 |

TABLE 2

Environmental Variables

| Environmental Variables | Definition | Exported |
|---|---|---|
| Ticks | Incremental number of time steps in the environment | Yes |
| Paranoia | Set level of paranoia for all nodes | Yes F3 |
| Radius | Set level of radius defining locality for all nodes | Yes |
| Network-Nervousness-Computation | Calculation mechanism for network nervousness of Additive or Mean of all neighboring node nervousness | No |
| Network-Nervousness | Simulation average of nervousness of all nodes in the simulation. | No |
| Simulation World | World wrap at horizontal and vertical boundaries | NA |

The third block (FIG. 9) incorporates the elements of blocks one (FIG. 5) and two (FIG. 7) to demonstrate the emergent behavior for network defense, based on the level of node nervousness and network nervousness, framed by node and network properties. This was performed through analysis of the system behavior, and provides valuable information about emergent network defense. In FIG. 8, Three Alerts Demonstrate Emergent Behavior demonstrates this emergent behavior, as an alert is issued to the node (110) such by as an anti-virus alert detecting malware. The software shown in FIG. 8 can be provided for instance for use by an administrator at a node, or at a central location, and is based on the algorithms noted above. Note at the time of the alert (804) the host will patch the agent, which causes the attack surface to decrease, and the level of nervousness will decrease (as shown by the gap at (804)). Then over time the system will return to a steady state, waiting for the next alert and response. The top chart shows the internal exposure, network exposure, nervousness and attack surface for a single agent. The bottom chart shows the network nervousness, and the various agents for the entire network. At the end of this simulation, the attack surface value of agent zero at output (808) was 0.17, below the maximum of 1. Signal (806) shows that the variance in the network nervousness returns to a stable state (about 20-30 on the Y-scale).

Finally, each host communicates with other hosts within its local network as demonstrated in FIG. 9 (Theoretical Context Diagram for Block Three). In this figure, all hosts are local neighbors of all other hosts in this limited view.

In addition to the description above, the present invention is described in the following documents: (a) dissertation entitled Emergent Network Defense, (b) Environmental Primitive Awareness for Network Defense (Paper), (c) A Nervous Network: Theory and Model (Joint), (d) A Nervous Network: Theory and Model (single author), and (e) Environmental Primitive Awareness for Network Defense (hereinafter "the papers"), which are all part of the provisional application and are incorporated in their entireties herein by reference. The papers, which are part of the specification, disclose exemplary embodiments of the present invention.

The invention makes use of a processor or controller at each endpoint or node to perform various functions and operations in accordance with the finite state machine model. The processor at each endpoint may also be provided with one or more of a wide variety of components or subsystems including, for example, a co-processor, register, data processing devices and subsystems, wired or wireless communication links, input devices, monitors, memory or storage devices such as a database. All or parts of the system and processes can be stored on or read from computer-readable media. The system can include computer-readable medium, such as a hard disk, having stored thereon machine executable instructions for performing the processes described.

For instance, the node (also referred to as the host) processor can implement all of the operations performed above, and as shown in FIG. 2 where the node operations are shown above the emergent characteristics 10 and network operations are the emergent characteristics 10 and below. In addition, data necessary to the operation can be stored in a storage device such as a memory or database. Still further, all operations occur continuously and in real-time, so that the system is able to immediately react to threats. And, the invention can be integrated with a centralized processor to centrally monitor status of the network, whereby one or more of the nodes communication with the central location.

The references noted herein are hereby incorporated by reference. The description and drawings of the present invention provided in the paper should be considered as illustrative only of the principles of the invention. The invention may be configured in a variety of ways and is not intended to be limited by the preferred embodiment. Numerous applications of the invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

The invention claimed is:

1. A node for use in a network having a plurality of nodes, said node comprising:
   a processing device configured to sense neighboring node(s) and determine if the sensed neighboring node(s) is within a predetermined closeness of said node, said processing device further configured to determine a level of nervousness of said node based on the determination and to send and/or receive communication as to the level of nervousness to the neighboring node(s),
   wherein the predetermined closeness of said node is measured by a logical closeness and the logical closeness comprises network hops, network link, or vertices analysis, and
   wherein the level of nervousness is based on one or more of the following information security hygiene configurations: time since the node received and applied an update patch for an application; time since the node ensured policy has current confirmations from a configuration management server; time since an administrator checked the node's current local policy configuration; performing an activity that triggers an alert for suspicious events; performing a signature or heuristic activity that triggers local malware or suspicious behavior alerts; and time since updated with malware or threat signatures.

2. The node of claim 1, wherein said node further comprises one or more data elements and said processing device controls said one or more data elements.

3. The node of claim 2, wherein said one or more data elements comprise a storage sector.

4. The node of claim 1, wherein the level of nervousness decreases with increased node hygiene, whereby node hygiene comprises a current state of a node's defensive posture comprised of node attack surface, and wherein node hygiene comprises any one or more of updates with malware signatures or threat signatures, the application of a patch or update, a system configuration update, the manual validation of hygiene by a system administration, or receipt of a calming pheromone that reduces the level of node nervousness.

5. The node of claim 1, wherein the level of nervousness increases with decreased node hygiene comprising any one or more of an increase in time since the node last received and applied an update patch for an application, the node ensured policy has current confirmations from a configuration management server, an administrator manually checked the node's current local policy configuration, the node experiences an activity that triggers an alert for suspicious events, or a signature or heuristic activity that triggers local malware or suspicious behavior alerts an activity that triggers an alert for suspicious events.

6. The node of claim 1, wherein said processing device is further configured to receive a signal from each of the neighboring node(s), the received signal indicating a level of nervousness of said neighboring node.

7. The node of claim 6, wherein the level of nervousness is based on the level of nervousness of said neighboring node(s).

8. The node of claim 7, wherein the level of nervousness is based on the frequency received or specific type of pheromone.

9. The node of claim 6, wherein the level of nervousness is based on the immediate environmental characteristics, termed stigmergy.

10. The node of claim 1, wherein said processing device receives a paranoia value and determines the level of nervousness based on the paranoia value.

11. The node of claim 1, wherein said processing device is configured to determine an attack surface.

12. The node of claim 1, wherein the level of nervousness is based on user behavior activity including time since the user last logged into the node, files and network resources access by the user, and use of privileges based on user roles.

13. The node of claim 1, wherein the level of nervousness decreases with increased node hygiene, whereby node hygiene comprises a current state of a node's defensive posture comprised of node attack surface, and wherein node hygiene comprises manual validation of hygiene by a system administration, or the receipt of a calming pheromone that reduces the level of node nervousness.

14. The node of claim 1, wherein the level of nervousness is based on received signals from neighboring nodes.

15. The node of claim 1, wherein the logical closeness and node hygiene comprises a risk assessment to determine a level of risk presented by the sensed neighboring node.

16. A network comprising:
    a plurality of nodes, each node having a processing device configured to sense at least one neighboring node and determine if the sensed neighboring node is within a predetermined logical closeness, said processing device further configured to determine a level of nervousness of the node based on the termination and to communicate the level of nervousness of the node to the at least one neighboring node,
    wherein the logical closeness comprises network hops, network link, or vertices analysis, and
    wherein the level of nervousness is based on multiple factors dependent on the node, and may include one or more of the following: time since the node received and applied an update patch for an critical application; time since the node checked in ensured policy has current confirmations from a configuration management server; time since an administrator checked the node's current local policy configuration; performing an activity that triggers an alert for suspicious events; performing a signature or heuristic activity that triggers local IDS or anti-virus malware or suspicious behavior alerts; and time since updated with malware and or threat signatures.

17. The node of claim 16, wherein the level of nervousness decreases based on increased node hygiene and/or input from neighboring nodes with decreased nervousness.

18. The node of claim 16, wherein the level of nervousness increases based on decreased node hygiene and/or input from neighboring nodes with increased nervousness.

19. The node of claim 16, wherein the node state alters based on neighbor input, possibly increasing or decreasing attack surface and/or hygiene.

20. The network of claim 16, wherein the network operates in a distributed and decentralized network.

21. The network of claim 16, wherein the level of nervousness is based on an internal nervousness of the node and a network nervousness of the network.

22. The network of claim 21, wherein the internal nervousness of the node includes physical embodiments of the node.

23. The network of claim 22, wherein the internal nervousness of the node comprise a logical attack surface.

24. The network of claim 21, wherein the network nervousness includes input/output processes of the node, points of communication where the node interfaces with the network.

25. The network of claim 24, wherein the points of communication comprise a user attack surface as the user interfaces with the node.

26. The network of claim 16, wherein the network can be utilized for predictive analytics and to model complex simulations for decision support systems.

27. The network of claim 16 wherein the network must be composed of a minimum number of nodes for the network to determine the level of nervousness in a distributed and decentralized manner.

28. A computer-implemented method for use in a network having a plurality of nodes, the method comprising:
   determining at one of the plurality of nodes, if at least one neighboring node is within a predetermined logical closeness of the one of the plurality of nodes;
   determining at the one of the plurality of nodes, a level of nervousness for the one of the plurality of nodes determined to be within the predetermined logical closeness; and
   communicating at the one of the plurality of nodes, the level of nervousness to the at least one neighboring node
   wherein the logical closeness comprises network hops, network link, or vertices analysis, and
   wherein the level of nervousness is based on one or more of the following information security hygiene configurations: time since the node received and applied an update patch for an application; time since the node ensured policy has current confirmations from a configuration management server; time since an administrator checked the node's current local policy configuration; performing an activity that triggers an alert for suspicious events; performing a signature or heuristic activity that triggers local malware or suspicious behavior alerts; and time since updated with malware or threat signatures.

29. A node for use in a network having a plurality of nodes, said node comprising:
   a processing device configured to determine if at least one neighboring node is within a predetermined closeness of said node, measured by a logical closeness, said processing device further configured to receive a level of nervousness from at least one neighboring node determined to be within the predetermined closeness, and to determine a level of nervousness of said node based at least in part on the received level of nervousness from the at least one neighboring node determined to be within the predetermined closeness,
   wherein the logical closeness comprises network hops, network link, or vertices analysis, and
   wherein the level of nervousness is based on one or more of the following information security hygiene configurations: time since the node received and applied an update patch for an application; time since the node ensured policy has current confirmations from a configuration management server; time since an administrator checked the node's current local policy configuration: performing an activity that triggers an alert for suspicious events; performing a signature or heuristic activity that triggers local malware or suspicious behavior alerts; and time since updated with malware or threat signatures.

30. The node of claim 29, said processing device further sending the determined level of nervousness to the at least one neighboring node.

* * * * *

UNITED STATES PATENT AND TRADEMARK OFFICE
CERTIFICATE OF CORRECTION

PATENT NO.         : 9,860,276 B2                                       Page 1 of 1
APPLICATION NO.    : 14/428590
DATED              : January 2, 2018
INVENTOR(S)        : Earl N. Crane et al.

It is certified that error appears in the above-identified patent and that said Letters Patent is hereby corrected as shown below:

On the Title Page

Item (72) Inventors:
Change "Sara M. Crane" to --Sarah M. Crane--; and
Change "Julie C. Ryan" to --Julie J.C.H. Ryan--.

Signed and Sealed this
Thirtieth Day of June, 2020

Andrei Iancu
*Director of the United States Patent and Trademark Office*